United States Patent
Greenberg et al.

(10) Patent No.: US 6,722,159 B2
(45) Date of Patent: Apr. 20, 2004

(54) PHOTOCATALYTICALLY-ACTIVATED SELF-CLEANING ARTICLE AND METHOD OF MAKING SAME

(75) Inventors: Charles B. Greenberg, Murrysville, PA (US); Caroline S. Harris, Pittsburgh, PA (US); Vincent Korthuis, Plano, TX (US); Luke A. Kutilek, Oakmont, PA (US); David E. Singleton, Natrona Heights, PA (US); Janos Szanyi, Oakmont, PA (US); James P. Thiel, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 108 days.

(21) Appl. No.: 10/075,316

(22) Filed: Feb. 14, 2002

(65) Prior Publication Data

US 2002/0114945 A1 Aug. 22, 2002

Related U.S. Application Data

(62) Division of application No. 09/282,943, filed on Apr. 1, 1999, now Pat. No. 6,413,581, which is a division of application No. 08/899,257, filed on Jul. 23, 1997, now Pat. No. 6,027,766.
(60) Provisional application No. 60/040,566, filed on Mar. 14, 1997, and provisional application No. 60/040,565, filed on Mar. 14, 1997.

(51) Int. Cl.[7] ............................................. C03C 17/245
(52) U.S. Cl. .................. 65/60.2; 65/60.5; 65/60.52; 65/32.4; 65/99.4
(58) Field of Search ................. 65/32.4, 60.5, 65/60.52, 60.2, 95, 97, 99.2, 99.4

(56) References Cited

U.S. PATENT DOCUMENTS 3,630,796 A 12/1971 Yokozawa et al.
4,017,661 A 4/1977 Gillery
4,123,244 A * 10/1978 Leclercq et al. ............ 118/305

(List continued on next page.)

FOREIGN PATENT DOCUMENTS

| EP | 0 071 865 | 2/1983 |
| EP | 0 348 185 | 12/1989 |
| EP | 0 489 621 | 6/1992 |

(List continued on next page.)

OTHER PUBLICATIONS

D. R. Uhlmann, "Glass: Science and Technology", vol. 2, Processing I, pp. 253–284 (1984) (No month available).
88–158890, Abstract Only, Derwent JP 860243762, Glass Article Difficult Soil Coating Thin Titanium Di Oxide Coating Contain Platinum@Rhodium Palladium@. (1988) (No month available).
Chemical Abstracts, 116 89812a, Sokolov, et al. "Selective Activation of Smooth Surfaces of Glass and Ceramic Articles Before Chemical Metalization," Abstract only.

(List continued on next page.)

*Primary Examiner*—Sean Vincent
(74) *Attorney, Agent, or Firm*—Andrew C. Siminerio

(57) ABSTRACT

A method and article are disclosed wherein a substrate is provided with a photocatalytically-activated self-cleaning surface by forming a photocatalytically-activated self-cleaning coating on the substrate by spray pyrolysis chemical vapor deposition or magnetron sputter vacuum deposition. The coating has a thickness of at least about 500 Angstroms to limit sodium-ion poisoning to a portion of the coating facing the substrate. Alternatively, a sodium ion diffusion barrier layer is deposited over the substrate prior to the deposition of the photocatalytically-activated self-cleaning coating to prevent sodium ion poisoning of the photocatalytically-activated self-cleaning coating. The substrate includes glass substrates, including glass sheet and continuous float glass ribbon.

39 Claims, 1 Drawing Sheet

U.S. PATENT DOCUMENTS

| | | |
|---|---|---|
| 4,238,276 A | 12/1980 | Kinugawa et al. |
| 4,485,146 A | 11/1984 | Mizuhashi et al. |
| 4,544,470 A | 10/1985 | Hetrick |
| 4,888,038 A | 12/1989 | Herrington et al. |
| 4,892,712 A | 1/1990 | Robertson et al. |
| 4,995,893 A * | 2/1991 | Jenkins et al. ............. 65/17.4 |
| 5,028,568 A | 7/1991 | Anderson et al. |
| 5,032,241 A | 7/1991 | Robertson et al. |
| 5,035,784 A | 7/1991 | Anderson et al. |
| 5,165,972 A | 11/1992 | Porter |
| 5,244,692 A * | 9/1993 | Zagdoun et al. ......... 427/126.3 |
| 5,304,394 A | 4/1994 | Sauvinet et al. |
| 5,308,805 A | 5/1994 | Baker et al. |
| 5,368,892 A | 11/1994 | Berquier |
| 5,389,427 A | 2/1995 | Berquier |
| 5,478,783 A | 12/1995 | Higby et al. |
| 5,522,911 A * | 6/1996 | Terneu et al. ................. 65/27 |
| 5,525,406 A | 6/1996 | Goodman et al. |
| 5,618,579 A | 4/1997 | Boire et al. |
| 5,698,262 A | 12/1997 | Soubeyrand et al. |
| 5,735,922 A | 4/1998 | Woodward et al. |
| 5,745,291 A | 4/1998 | Jenkinson |
| 5,749,931 A | 5/1998 | Goodman et al. |
| 5,751,484 A | 5/1998 | Goodman et al. |
| 5,755,845 A | 5/1998 | Woodward et al. |
| 5,764,415 A | 6/1998 | Nelson et al. |
| 5,773,086 A | 6/1998 | McCurdy et al. |
| 5,854,169 A | 12/1998 | Heller et al. |
| 5,939,201 A | 8/1999 | Boire et al. |
| 5,961,843 A | 10/1999 | Hayakawa et al. |
| 6,001,462 A | 12/1999 | Purvis et al. |
| 6,045,896 A | 4/2000 | Boire et al. |
| 6,068,914 A | 5/2000 | Boire et al. |
| 6,103,360 A | 8/2000 | Caldwell et al. |
| 6,106,955 A | 8/2000 | Ogawa et al. |
| 6,210,779 B1 | 4/2001 | Watanabe et al. |
| 6,228,480 B1 | 5/2001 | Kimura et al. |
| 6,294,246 B1 | 9/2001 | Watanabe et al. |
| 6,294,247 B1 | 9/2001 | Watanabe et al. |
| 6,322,881 B1 | 11/2001 | Boire et al. |
| 6,326,079 B1 | 12/2001 | Philippe et al. |
| 6,387,844 B1 | 5/2002 | Fujishima et al. |
| 6,413,581 B1 * | 7/2002 | Greenberg et al. .......... 427/226 |

FOREIGN PATENT DOCUMENTS

| | | |
|---|---|---|
| EP | 0 544 577 | 6/1993 |
| EP | 0 633 064 | 1/1995 |
| EP | 0 650 938 | 5/1995 |
| EP | 0 816 466 | 1/1998 |
| GB | 2026454 * | 2/1980 |
| GB | 2 031 756 | 4/1980 |
| GB | 2 320 499 | 6/1998 |
| GB | 3 320 503 | 6/1998 |
| GB | 2 324 098 | 10/1998 |
| GB | 2 355 273 | 4/2001 |
| GB | 2361246 A * | 10/2002 |
| JP | 7-2548 | 1/1995 |
| JP | 7-3463 | 1/1995 |
| JP | 7-99425 | 3/1995 |
| JP | 7-117600 | 4/1995 |
| JP | 7-182019 | 6/1995 |
| JP | 7-182020 | 6/1995 |
| JP | 7-205019 | 7/1995 |
| JP | 9-173775 | 7/1997 |
| JP | 9-173783 | 7/1997 |
| JP | 9-227157 | 9/1997 |
| JP | 9-227158 | 9/1997 |
| JP | 9-235140 | 9/1997 |
| JP | 10-146530 | 6/1998 |
| JP | 9-241037 | 2/1999 |
| JP | 11-512337 | 10/1999 |
| WO | 95/15816 | 6/1995 |
| WO | 96/13327 | 5/1996 |
| WO | 96/29375 | 9/1996 |
| WO | 98/06510 | 2/1998 |
| WO | 01/10790 | 2/2001 |
| WO | 01/72652 | 10/2001 |

OTHER PUBLICATIONS

Apr. 3, 2000 Letter From Mrs. Colette Ward, Patent Litigation Enquiries, British Library.

Robert J. Good et al. The Modern Theory of Contact Angles and the Hydrogen Bond Components of Surface Energies in Modern Approaches to Wetability, Theory and Applications, pp 1–3, Schrader et al. Eds. (1991 No month available).

H. H. Dunken, Glass Surfaces, Treatise on Materials Science and Technology, Vo. 22, pp. 1–75, 1982 (No month available).

The Japan Times, May 21, 2002, Tuesday, Race for Technology, pp. 2–5, from LexisNexis.

Yusumori et al., Preparation of $TiO_2$ Fine Particles Supported on Silica Gel as Photocatalyst, Journal of the Ceramic Society of Japan, 102 (1994) pp. 702–707 (No month available).

Wold; Photocatalytic Properties of $TiO_2$ Chem. Mater., 1993, 5, pp. 280–283 (No month available).

Bach et al.; Kristallstruktur und Optische Eigenshaften von Dunnen Organogenen Titanoxyd–Schichten Auf Glasunterlagen [Crystal Structure and Optical Properties of Thin Organogenic Titanium Oxide Layers on Glass Substrates], Thin Solid Films 1 (1967/68), pp. 255–276, (No month available).

Meng et al.; The Effect of Substrate Temperature on the Properties of Sputtered Titanium Oxide Films, Applied Surface Science 65/66 (1993) pp. 235–239 (No month available).

Yoko et al.; Sol–Gel–Derived $TiO_2$ Film Semiconductor Electrode for Photocleavage of Water, J. Electrochem Soc., vol. 138(8), Aug. 1991, pp. 2279–2284.

Oxide Layers Deposited from Organic Solutions, H. Schroeder in Physics of Thin Films: Advances in Research and Development, pp. 105–112, vol. 5, 1969 Academic Press (No month available).

* cited by examiner

PHOTOCATALYTICALLY-ACTIVATED SELF-CLEANING ARTICLE AND METHOD OF MAKING SAME

CROSS REFERENCE TO RELATED APPLICATIONS

This application is a divisional of U.S. application Ser. No. 09/282,943 filed Apr. 1, 1999, now U.S. Pat. No 6,413,581, which is a divisional of U.S. Non-provisional application Ser. No. 08/899,257 filed Jul. 23, 1997, now U.S. Pat. No, 6,027,766, which claims the benefit of U.S. Provisional Application Serial No. 60/040,566 filed Mar. 14, 1997. U.S. Provisional Application Serial No. 60/040,565 filed Mar. 14, 1997, and U.S. Regular application Ser. No. 08/899,265 to Greenberg et al., entitled "Photocatalytically-Activated Self-Cleaning Appliances", filed even date herewith, now U.S. Pat. No. 6,054,227 are also related to the present application and are hereby incorporated by reference.

BACKGROUND OF THE INVENTION

1. Field of the Invention

The present invention relates to a method of depositing a photocatalytically-activated self-cleaning coating on a substrate (e.g. glass sheet or a continuous glass float ribbon), to a method of preventing sodium ion poisoning of the photocatalytically-activated self cleaning coating deposited over a sodium ion containing substrate and to articles of manufacture prepared according to the methods.

2. Description of the Related Art

For many substrates (e.g. glass substrates), it is desirable that the surface of the substrate remain "clean," that is to say free of surface contaminants, e.g. common organic and inorganic surface contaminants. Traditionally, this has meant that such surfaces must be cleaned frequently. This cleaning operation is typically performed manually or by mechanical devices. Either approach is quite labor, time and/or cost intensive. A need exists for substrates having surfaces that are self-cleaning or at least easier to clean, which would eliminate or reduce the need for such manual or mechanical cleaning.

Titanium dioxide ($TiO_2$) coatings are known to provide a photocatalytically-activated self-cleaning (hereinafter "PASC") surface on a substrate. Publications directed to the formation of a PASC titanium dioxide coating on a glass substrate include U.S. Pat. No. 5,595,813 and "Photooxidative Self-cleaning Transparent Titanium Dioxide Films on Glass", Paz et al., J. Mater. Res., Vol. 10, No. 11, pp. 2842–48 (Nov. 1995). Further, a bibliography of patents and articles relating generally to the photocatalytic oxidation of organic compounds is reported in *Bibliography of Work On The Photocatalytic Removal of Hazardous Compounds from Water and Air,* D. Blake, National Renewable Energy Laboratory (May 1994) and in an October 1995 update and an October 1996 update.

A presently available method of applying a PASC coating (e.g. a titanium dioxide PASC coating) to a substrate is the sol-gel method. With the sol-gel method an uncrystallized alcohol-solvent-based colloidal suspension (the sol) is spray, spin, or dip coated onto a substrate at or about room temperature. The substrate is then heated to a temperature within the range of about 100° C. to 800° C. (212° F. to 1472° F.), to either bond the PASC coating to the substrate and/or to cause the crystallization of the PASC coating, in order to form a crystallized PASC coating (the gel) on the substrate.

One limitation of applying a sol-gel PASC coating is that the sol-gel coating method is not economically or practically compatible with certain application conditions or substrates. For example, when it is desired to provide a PASC coating on a float ribbon during manufacture thereof, the ribbon may be too hot to accept the sol depending in part, on the solvent used in the sol solution. For many solvents used in sol-gel process, it is required to cool the hot float ribbon to about room temperature before applying the sol, and to reheat the float ribbon to a temperature sufficient to crystallize the sol into a PASC coating. Such cooling and reheating operations require a substantial investment in equipment, energy and handling costs, and significantly decrease production efficiency.

The PASC activity of PASC coatings may be significantly reduced or destroyed if sodium ions are present in the substrate and migrate from the substrate into the PASC coating. This process is known as sodium poisoning or sodium ion poisoning. For many substrates which contain sodium ions, the rate of migration of sodium ions into coatings increases as the temperature of the substrate increases. Thus another limitation of the sol-gel coating method is that reheating the substrate increases the opportunity for sodium ion migration, and in turn, sodium ion poisoning of a PASC coating.

Another limitation of forming PASC coatings by the sol-gel method is the thickness of the coatings e.g. several microns thick. Such thick PASC coatings may have an adverse affect on the optical and/or aesthetic properties of PASC coated articles.

As can be appreciated from the foregoing, a need exists for an article of manufacture having a PASC coating deposited therein and for a method of depositing a PASC coating that does not suffer from the drawbacks known in the art.

SUMMARY OF THE INVENTION

The present invention is directed to a PASC article of manufacture which includes a substrate having at least one surface and a PASC coating, e.g. titanium dioxide, deposited over the surface of the substrate by a process selected from the group consisting of chemical vapor deposition (hereinafter "CVD"), spray pyrolysis and magnetron sputtered vacuum deposition (hereinafter "MSVD"). The present invention is also directed to a method of making such an article of manufacture.

The present invention is also directed to a PASC article of manufacture which includes a substrate having at least one surface, a sodium ion diffusion barrier (hereafter "SIDB") layer e.g. tin oxide, titanium dioxide, aluminum oxide layers and mixtures thereof deposited over the surface of the substrate, and a PASC coating e.g. a titanium dioxide coating deposited over the SIDB layer. The PASC coating and the SIDE layer are each deposited by a process selected from the group consisting of CVD, spray pyrolysis and MSVD. The present invention is also directed to a method of making such an article of manufacture.

DESCRIPTION OF THE PREFERRED EMBODIMENTS

Figure 1:
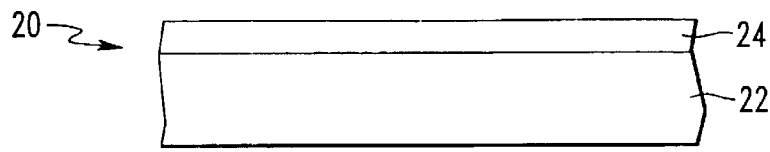
FIG. 1 is an elevational view of a portion of a substrate having a PASC coating dispersed thereon.

Referring now to FIG. 1, there is shown an article 20 having features of the present invention. The article 20 includes a substrate 22 having deposited thereon a PASC coating 24. The substrate 22 is not limiting to the invention and may include a glass substrate e.g. a glass sheet or a continuous glass float ribbon, a plastic substrate, a metal substrate and an enameled substrate.

Figure 2:
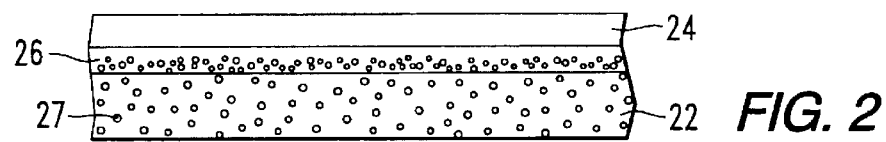
FIG. 2 is a view similar to the view of FIG. 1 illustrating an SIDB layer interposed between the substrate and the PASC coating.

The PASC coating 24 may be directly over the substrate 22 as shown in FIG. 1 or in the alternative other layers may be interposed between the PASC coating 24 and the substrate 22, e.g. including but not limited to an SIDB layer 26 as shown in FIG. 2 and as described in more detail hereafter. Further, as may be appreciated by those skilled in the art, the PASC coating 24 may be the uppermost layer of a multilayer stack of coatings present on substrate 22 or the PASC coating 24 may be embedded as one of the layers other than the uppermost layer within such a multi-layer stack provided sufficient actinic radiation may pass through any coatings deposited above PASC coating 24 to photocatalytically activate PASC coating 24 and provided active radicals can pass through the coatings deposited above the PASC coating 24 to react with the organic contaminants present on the uppermost layer of the multilayer stack.

The PASC coating 24 may be any coating which is photocatalytically activated to be self-cleaning and which can be deposited by the CVD method, the spray pyrolysis method or the MSVD method. For example but not limiting to the invention, the PASC coating 24 may include one or more metal oxides such as titanium oxides, iron oxides, silver oxides, copper oxides, tungsten oxides, zinc oxides, zinc/tin oxides, strontium titanate and mixtures thereof. The metal oxide may include oxides, super-oxides or sub-oxides of the metal.

A preferred PASC coating 24 is a titanium dioxide coating. Titanium dioxide exists in an amorphous form and three crystalline forms, namely the anatase, rutile and brookite crystalline forms. Anatase phase titanium dioxide, is preferred because it exhibits strong PASC activity while also possessing excellent resistance to chemical attack and excellent physical durability. Further, anatase phase titanium dioxide has high transmission in the visible region of the spectrum which gives thin coatings of anatase titanium dioxide with excellent optical properties. The rutile phase of titanium dioxide also exhibits PASC activity. Combinations of the anatase and/or rutile phases with the brookite and/or amorphous phases are acceptable for the present invention provided the combination exhibits PASC activity.

The PASC coating 24 must be sufficiently thick so as to provide an acceptable level of PASC activity. There is no absolute value which renders the PASC coating 24 "acceptable" or "unacceptable" because whether a PASC coating has en acceptable level of PASC activity is largely determined by the purpose and conditions under which the PASC coated article is being used and the performance standards selected in connection with that purpose. In general, thicker PASC coatings provide higher PASC activity. However, other considerations may weigh toward a thinner coating, e.g. thinner coatings are preferred when the article is to have high transmission for aesthetic or optical reasons; the surface contaminants on the surface of the article are easily removed with a thinner PASC coating, the coating is exposed to substantial irradiation and/or the PASC coating 24 will be exposed to sodium ion poisoning discussed in more detail below. In a CVD process, a photocatalytically-active self-cleaning coating 24 is formed which may range from about 100 Å to 2500 Å thick. For a wide variety of applications, it is preferred that the PASC coating is at least about 200 Angstroms (Å), preferably at least about 400 Å and more preferably at least about 500 Å thick. It has been found that when the substrate 22 is a piece of float glass and the PASC coating 24 is an anatase titanium dioxide PASC coating formed directly over the piece or float glass by the CVD method, that a thickness of at least about 500 Å provides a PASC reaction rate in the range of about $2 \times 10^{-3}$ to about $5 \times 10^{-3}$ per centimer minute (hereinafter "$cm^{-1}min^{-1}$") for the removal of a stearic acid test film when the PASC coating was exposed to ultraviolet radiation from a light source such as that sold under the tradename UVA-340 by the Q-Panel Company of Cleveland, Ohio, having an intensity of about 20 watts per square meter (hereinafter $W/m^2$) at the PASC coating surface which is acceptable for a wide range of applications.

In accordance with the present invention, a thin e.g., less than 1 micron, more preferably less than 0.5 micron PASC coating is formed on the substrate 22 by spray pyrolysis CVD or MSVD methods. In the spray pyrolysis method a metal-containing precursor is carried either in an aqueous suspension, e.g. an aqueous solution, and in the CVD method a carrier gas, e.g. nitrogen gas, and directed toward the surface of the substrate 22 while the substrate 22 is at a temperature high enough to cause the metal-containing precursor to decompose and to form a PASC coating 24 on the substrate 22. In the MSVD method, a metal-containing cathode target is sputtered under negative pressure in an inert or oxygen-containing atmosphere to deposit a sputter coating over substrate 22. The substrate 22 during or after coating is heated to cause crystallization of the sputter coating to form the PASC coating 24.

Each of the methods has advantages and limitations e.g. the CVD method and pyrolysis method are preferred over the spray pyrolysis method because the aqueous solution of the spray pyrolysis method may result in the presence of $OH^-$ ions in the PASC coating 24, which may, in turn, inhibit proper crystalline formation in the PASC coating 24 thereby reducing the PASC activity of the coating. The CVD method and pyrolysis method are preferred over the MSVD method because it is compatible with coating continuous substrates found at elevated temperatures e.g. glass float ribbons. The CVD, spray pyrolysis and MSVD methods of depositing PASC coating 24 are discussed in more detail below. As may be appreciated, spray pyrolysis and CVD methods may be used to deposit thin (e.g., a few hundred Angstrom thick) metal oxide coatings (including titanium dioxide coatings) over a substrate. Such coatings are described in U.S. Pat. Nos. 4,344,986; 4,393,095; 4,400,412; 4,719,126; 4,853, 257; and 4,971,843 which patents are hereby incorporated by reference.

Metal-containing precursors that may be used in the practice of the present invention to form titanium dioxide PASC coatings by the CVD method include but are not limited to titanium tetrachloride ($TiCl_4$), titanium tetraisopropoxide ($Ti(OC_3H_7)_4$) (hereinafter "TTIP") and titanium tetraethoxide ($Ti(OC_2H_5)_4$) (hereinafter "TTEt"). Carrier gases that may be used in the CVD method include but are not limited to air, nitrogen, oxygen, ammonia and mixtures thereof. The preferred carrier gas is nitrogen and the preferred metal-containing precursor is TTIP. The concentration of the metal-containing precursor in the carrier gas is generally in the range of 0.1% to 0.4% by volume for the three listed metal-containing precursors, but as may be appreciated by those skilled in the art, these concentrations may be varied for other metal-containing precursors.

Metal-containing precursors that may be used in the practice of the invention to form PASC coatings by the spray pyrolysis method include relatively water insoluble organometallic reactants, specifically metal acetylacetonate compounds, which are jet milled or wet ground to a particle size of less than about 10 microns and suspended in an aqueous medium by the use of a chemical wetting agent. A suitable metal acetylacetonate to form a titanium dioxide PASC coating is titanyl acetylacetonate ($TiO(C_5H_7O_2)_2$). The relative concentration of the metal acetylacetonate in the aqueous suspension preferably ranges from about 5 to 40 weight percent of the aqueous suspension. The wetting agent may be any relatively low foaming surfactant, including anionic, nonionic or cationic compositions, although nonionic is preferred. The wetting agent is typically added at about 0.24% by weight, but can range from about 0.01% to 1% or more. The aqueous medium is preferably distilled or deionized water. Aqueous suspensions for pyrolytic deposition of metal-containing films are described in U.S. Pat. No. 4,719,127 particularly at column 2, line 16, to column 4, line 48, which is hereby incorporated herein by reference.

For both the CVD and the spray pyrolysis methods, the temperature of the substrate 22 during formation of the PASC coating 24 thereon must be within the range which will cause the metal containing precursor to decompose and form a coating having PASC activity (e.g. crystalline phase for metal oxide PASC coatings). As may be appreciated, the lower limit of this temperature range is largely affected by the decomposition temperature of the selected metal-containing precursor. For the above listed titanium-containing precursors, the minimum temperature of substrate 22 which will provide sufficient decomposition of the precursor is within the temperature range of about 400° C. (752° F.), about 500° C. (932° F.). The upper limit of this temperature range may be affected by the substrate being coated. For example where the substrate 22 is a glass float ribbon and the PASC coating 24 is applied to the float ribbon during manufacture of the float ribbon, the float glass may reach temperatures in excess of 1000° C. (1832° F.). The float glass ribbon is usually attenuated or sized (e.g. stretched or compressed) at temperature above 800° C. (1472° F.). If the PASC coating 24 is applied while the float glass before or during attenuation, the PASC coating 24 may crack or crinkle as the float ribbon is stretched or compressed respectively. Therefore, in the practice of the invention it is preferred to apply the PASC coating when the float ribbon is dimensionally stable e.g. below about 800° C. (1472° F.) for soda lime silica glass, and the float ribbon is at a temperature to decompose the metal-containing precursor e.g. above about 400° C. (752° F.).

Forming PASC coating 24 by CVD or spray pyrolysis methods is particularly well suited for practice during the manufacture of the glass float ribbon. In general, a glass float ribbon is manufactured by melting glass batch materials in a furnace and delivering the refined molten glass onto a bath of molten tin. The molten glass on the bath is pulled across the tin bath as a continuous glass ribbon while it is sized and controllably cooled to form a dimensionally stable glass float ribbon. The float ribbon is removed from the tin bath and moved by conveying rolls through a lehr to anneal the float ribbon. The annealed float ribbon is then moved through cutting stations on conveyor rolls where the ribbon is cut into glass sheets of desired length and width. U.S. Pat. Nos. 4,466,562 and 4,671,155 hereby incorporated by reference provide a discussion of the float glass process.

Temperatures of the float ribbon on the tin bath generally range from about 1093.3° C. (2000° F.) at the delivery end of the bath to about 538° C. (1000° F.) at the exit end of the bath. The temperature of the float ribbon between the tin bath and the annealing lehr is generally in the range of about 480° C. (896° F.) to about 580° C. (1076° F.); the temperatures of the float ribbon in the annealing lehr generally range from about 204° C. (400° F.) to about 557° C. (1035° F.) peak.

U.S. Pat. Nos. 4,853,257; 4,971,843; 5,536,718; 5,464,657; and 5,599,387 hereby incorporated by reference describe CVD coating apparatus and methods that may be used in the practice of the invention to coat the float ribbon during manufacture thereof. Because the CVD method can coat a moving float ribbon yet withstand the harsh environments associated with manufacturing the float ribbon, the CVD method is well suited to provide the PASC coating 24 on the float ribbon. The CVD coating apparatus may be employed at several points in the float ribbon manufacturing process. For example, CVD coating apparatus may be employed as the float ribbon travels through the tin bath after it exits the tin bath, before it enters the annealing lehr, as it travels through the annealing lehr, or after it exits the annealing lehr.

As may be appreciated by those skilled in the art, concentration of the metal-containing precursor in the carrier gas, the rate of flow of the carrier gas, the speed of the float ribbon (the "line speed"), the surface area of the CVD coating apparatus relative to the surface area of the float ribbon, the surface areas and rate of flow of exhausted carrier gas through exhaust vents of the CVD coating apparatus more particularly, the ratio of exhaust rate through the exhaust vents versus the carrier gas input rate through the CVD coating unit, known as the "exhaust matching ratio" and the temperature of the float ribbon are among the parameters which will affect the final thickness and morphology of the PASC coating 24 formed on float ribbon by the CVD process.

U.S. Pat. Nos. 4,719,126; 4,719,127; 4,111,150; and 3,660,061 hereby incorporated by reference describe spray pyrolysis apparatus and methods that may be used with the float ribbon manufacturing process. While the spray pyrolysis method like the CVD method is well suited for coating a moving float glass ribbon, the spray pyrolysis has more complex equipment than the CVD equipment and is usually employed between the exit end of the tin bath and the entrance end of the annealing lehr.

As can be appreciated by those skilled in the art, the constituents and concentration of the pyrolytically sprayed aqueous suspension, the line speed of the float ribbon, the number of pyrolytic spray guns, the spray pressure or volume, the spray pattern, and the temperature of the float ribbon at the time of deposition are among the parameters which will affect the final thickness and morphology of the PASC coating 24 formed on the float ribbon by spray pyrolysis.

As is known by those skilled in the art, the surface of the glass float ribbon on the molten tin (commonly referred to as the "tin side") has diffused tin in the surface which provides the tin side with a pattern of tin absorption that is different from the opposing surface not in contact with the molten tin (commonly referred to as "the air side"). This characteristic is discussed in *Chemical Characteristics of Float Glass Surfaces,* Seiger, J., JOURNAL OF NON-CRYSTALLINE SOLIDS, Vol. 19, pp. 213–220 (1975); *Penetration of Tin in The Bottom Surface of Float Glass: A Synthesis,* Columbin L. et al., JOURNAL OF NON-CRYSTALLINE SOLIDS, Vol. 38 & 39, pp. 551–556 (1980); and *Tin Oxidation State, Depth Profiles of $Sn^{2+}$ and $Sn^{4+}$ and Oxygen Diffusivity in Float Glass by Mössbauer Spectroscopy,* Williams, K. F. E. et al., JOURNAL OF NON-CRYSTALLINE SOLIDS, Vol. 211, pp. 164–172 (1997), which disclosures are hereby incorporated by reference. As may be appreciated by those skilled in the art, the PASC coating 24 may be formed on the air side of the float ribbon while it is supported on the tin bath (by the CVD method); on the air side of the float ribbon after it leaves the tin bath by either the CVD or spray pyrolysis methods and on the tin side of the float ribbon after it exits the tin bath by the CVD method. When the PASC coating 24 is formed on the tin side of float ribbon, it is expected that the tin and/or tin oxide present in glass surface will function as an SIDB layer 26 for the PASC coating 24 disposed thereon.

U.S. Pat. Nos. 4,379,040; 4,861,669; 4,900,633; 4,920,006; 4,938,857; 5,328,768; and 5,492,750 hereby incorporated by reference describe MSVD apparatus and methods to sputter coat metal oxide films on a substrate, including a glass substrate. The MSVD process is not generally compatible with providing a PASC coating over a glass float ribbon during its manufacture because, among other things, the MSVD process requires negative pressure during the sputtering operation which is difficult to form over a continuous moving float ribbon. However, the MSVD method is acceptable to deposit the PASC coating 24 on substrate 22 e.g., a glass sheet. As can be appreciated by those skilled in the art, the substrate 22 may be heated to temperatures in the range of about 400° C. (752° F.) to about 500° C. (932° F.) so that the MSVD sputtered coating on the substrate crystallizes during deposition process thereby eliminating a subsequent heating operation. Heating the substrate during sputtering is not a preferred method because the additional heating operation during sputtering may decrease throughput. Alternatively the sputter coating may be crystallized within the MSVD coating apparatus directly and without post heat treatment by using a high energy plasma, but again because of its tendency to reduce throughput through an MSVD coater, this is not a preferred method.

It was customary to attain a desired degree of oxidation in titanium oxide films by an evaporation technique carried out in two distinct stages; first, by depositing titanium oxide in an under-oxidized state and thereafter, by introducing an oxidizing atmosphere thereto to attain the desired degree of oxidation. It has been found according to the present invention that the titanium oxide can be successfully magnetically enhanced sputtered onto the substrate with the degree of oxidation desired, thus eliminating the need for further oxidation. Deposition of ideally oxidized titanium oxide films is also more easily controlled in the practice of the present invention than heretofore, yielding a more consistent final product. It is believed that the preferred titanium oxide films deposited according to the present invention comprise a combination of titanium dioxide intermixed with atoms and/or small agglomerations of titanium metal, i.e. films of titanium oxide having greater than 1.7 but less than 2.0 parts oxygen to parts titanium, and preferably between 1.9 and 2.0. Such films may be characterized as having an optical extinction coefficient between about 0.03 and 0.3, preferably between 0.03 arid 0.09, and most preferably between 0.06 and 0.05. The titanium oxide layer is preferably deposited with a thickness within the range of about 200 to 500 Angstroms to obtain the desired optical properties and film continuity.

The titanium oxide layer can be deposited according to the present invention by magnetically sputtering a titanium metal cathode in an evacuated atmosphere having partial pressures of oxygen and argon. Initially, the coating chamber 12 is evacuated to less than $3\times10-5$ torr, after which an atmosphere of about 75% argon and 25% oxygen at a total pressure of about $6\times10-4$ torr is established. The cathode is activated at a preselected constant electrical power, and the deposition rate and total chamber pressure are established at preselected values. Upon reaching the desired coating conditions, the cathode is scanned across the surface of the substrate at a preselected rate to deposit a thin layer of an ideally oxided film thereon. The luminous transmittance of the substrate is monitored during deposition by the photometer and photoelectric cell and decreases as the thickness of the film increases, from an initial value of about 90% for a glass substrate. Deposition rate, and therefore the degree of oxidation of the deposited titanium oxide film, is maintained constant either cyclically, or continuously, utilizing the embodiment of the invention. Deposition of the titanium oxide layer can be terminated when the luminous transmittance decreases to a value between about 72% and 76%, (about 80% to 85% of the transmittance of the uncoated substrate) a condition which is usually reached with a film thickness between about 300 Å and 350 Å, entailing about 5 to 7 passes of the cathode over the substrate. Generally during the above-described procedure, the oxygen input rate is gradually increased to compensate for decreasing amounts of outgassing from the coating chamber. The titanium oxide layer can have has an optical extinction coefficient between about 0.06 and 0.08 upon deposit, according to the present invention.

The preferred method to provide a PASC coating using the MSVD method is to sputter a coating on the substrate, remove the coated substrate from the MSVD coater and thereafter heat treat the coated substrate to crystallize the sputter coating into the PASC coating 24. For example, but not limiting to the invention, with the MSVD method, a target of titanium metal sputtered in an argon/oxygen atmosphere having about 5–50%, preferably about 20% oxygen, at a pressure of about 5–10 millitorr to sputter deposit a titanium dioxide coating of desired thickness on the substrate 22. The coating as deposited is not crystallized. The coated substrate is removed from the coater and heated to a temperature in the range of about 400° C. (752° F.) to about 600° C. (1112° F.) for a time period sufficient to promote formation of the PASC crystalline form of titanium dioxide to render PASC activity. Generally at least an hour at temperature in the range of about 400° C. (752° F.) to about 600° C. (1112° F.) is preferred. Where the substrate 22 is a glass sheet cut from a glass float ribbon, the PASC coating 24 may be sputter deposited on the air side and/or the tin side.

The substrate 22 having the PASC coating 24 deposited by the CVD, spray pyrolysis or MSVD methods may be subsequently subjected to one or more post-PASC coating annealing operations to increase the self-cleaning activity of the PASC coating 24. It is believed that such post-PASC coating annealing may increase self-cleaning activity of the PASC coating 24 by promoting formation of the desired PASC crystalline phase. As may be appreciated, the time and temperatures of the anneal may be affected by several factors, including the makeup of substrate 22, the makeup of PASC coating 24, the thickness of the PASC coating 24, and whether the PASC coating 24 is directly on the substrate 22 or is one layer of a multilayer stack on substrate 22. It has been determined that where the substrate 22 is a piece of float glass and the PASC coating is a 400 Å or 625 Å thick anatase titanium dioxide formed by the spray pyrolysis method, that annealing the coating at 500° C. (932° F.) for up to 13 minutes increased PASC activity.

As discussed above, whether the PASC coating is provided by the CVD process, the spray pyrolysis process or the MSVD process, where the substrate 22 includes sodium ions that can migrate from substrate 22 into the PASC coating deposited on substrate 22, the sodium ions may inhibit or destroy the photocatalytic activity of the PASC coating by forming inactive compounds while consuming titanium e.g. by forming sodium titanates or by causing recombination of photoexcited charges.

It has been found that the PASC coating may be formed over a sodium ion containing substrate 22 without loss of photocatalytic activity by: 1) providing for a limited partial sodium ion poisoning of a portion of the PASC coating; and/or 2) providing an SIDB layer 26. Each method is discussed in detail below.

It has been found that when the thickness of the PASC coating exceeds a minimum threshold value, the PASC activity is not destroyed by sodium ion migration even though the PASC coating is deposited over the surface of a sodium-ion containing substrate while the substrate is at a temperature sufficient to cause migration of sodium ions from substrate into the PASC coating. While the mechanism for this result is not completely understood, it is believed that when the thickness of the PASC coating exceeds this minimum thickness, the sodium ions are able to migrate only through a fraction of the overall thickness of the PASC coating during the time period at which the temperature of substrate exceeds the temperature which permits sodium ion migration. Thereafter, when the temperature of substrate falls below that which causes sodium ion migration, the sodium ions migration stops or "freezes" in place, resulting in a thickness of the PASC coating opposite from the substrate surface free of sodium ion poisoning and able to maintain PASC activity. This minimum thickness of the PASC coating as may be appreciated by those skilled in the art varies with expected parameters such as, but not limited to, the time at which substrate is held above the temperature at which sodium ion migration occurs, the use to which the PASC article of manufacture is to be put and the degree of PASC activity desired or required. It has been found that for a CVD deposited titanium dioxide PASC coating over a piece of soda-lime-silica flat glass, the thickness of the PASC coating should be a minimum of about 250 Å, preferably a minimum of about 400 Å and more preferably a minimum of about 500 Å to permit a sufficient portion of the PASC coating 24 to remain tree of sodium ion poisoning and retain its PASC activity.

Referring now to FIG. 2, in an alternative method of preventing sodium ion poisoning of the PASC coating, an SIDB layer 26 is provided between the PASC coating 24 and the substrate 22. The SIDB layer 26 may be the only layer between the PASC coating 24 and the substrate 22, or it may be one layer of a multilayer stack. Where a multilayer stack is employed, it is not required that the SIDB layer 26 be in contact with the substrate 22, provided the SIDB layer 26 is positioned between the PASC coating 24 and the substrate 22 to prevent sodium ion migration from the substrate 22 to the PASC coating 24.

The SIDB layer 26 may be formed of amorphous or crystalline metal oxides including but not limited to cobalt oxides, chromium oxides and iron oxides, tin oxides, silicon oxides, titanium oxides, zirconium oxides, fluorine-doped tin oxides, aluminum oxides, magnesium oxides, zinc oxides, and mixtures thereof. Mixtures include but are not limited to magnesium/aluminum oxides and zinc/tin oxides. As can be appreciated by those skilled in the art, the metal oxide may include oxides, super-oxides or sub-oxides of the metal. While the thickness of the SIDE layer necessary to prevent sodium ion poisoning of the PASC coating varies with several factors including the time period at which a substrate will be maintained at temperatures above which sodium ion migration occurs, the rate of sodium ion migration from the substrate, the rate of sodium ion migration through the SIDB layer, the thickness of the PASC coating and the degree of photocatalytic activity required for a given application, typically for most applications, the SIDB layer thickness should be in the range of at least about 100 Å, preferably at least about 250 Å and more preferably at least about 500 Å thick to prevent sodium ion poisoning of the PASC coating layer. The SIDB layer may be deposited over substrate 22 by CVD, spray pyrolysis, or MSVD methods. Where the spray pyrolysis or CVD methods are employed, the substrate 22 is preferably maintained at a temperature of at least about 400° C. (752° F.) to ensure decomposition of the metal-containing precursor to form the SIDB layer. The SIDB layer may be formed by other methods, including the sol-gel method, which sol-gel method as noted above is not compatible with the manufacture of a glass float ribbon.

A tin oxide SIDB layer may be deposited on substrate by spray pyrolysis by forming an aqueous suspension of dibutyltin difluoride $(C_4H_9)_2SnF_2$ and water and applying the aqueous suspension to the substrate via spray pyrolysis. In general, the aqueous suspension typically contains between 100 to 400 grams of dibutyltin difluoride per liter of water. Wetting agents may be used as suspension enhancers. During the preparation of the aqueous suspension, the dibutyltin difluoride particles may be milled to an average particle size of 1 to 10 microns. The aqueous suspension is preferably vigorously agitated to provide a uniform distribution of particles in suspension. The aqueous suspension is delivered by spray pyrolysis to the surface of a substrate which is at a temperature of at least about 400° C. (752° F.), preferably about 500° C. to 700° C. (932° F. to 1292° F.) whereupon the aqueous suspension pyrolyzes to form a tin oxide SIDB layer. As may be appreciated, the thickness of SIDB layer formed by this process may be controlled by, among other parameters, the coating line speed, the dibutyltin difluoride concentration in the aqueous suspension and the rate of spraying.

Alternatively the tin oxide SIDB layer may be formed by the CVD method on the substrate from a metal-containing precursor such as a monobutyltintrichloride vapor (hereinafter "MBTTCL") in an air carrier gas mixed with water vapor. The MBTTCL vapor may be present in a concentration of at least about 0.5% in the air carrier gas applied over substrate while the substrate is at a temperature sufficient to cause the deposition of a tin containing layer e.g. at least about 400° C. (952° F.), preferably about 500° C. to 800° C. (932° F. to 1472° F.) to form the tin oxide SIDB layer. As may be appreciated the thickness of the SIDB layer formed by this process may be controlled by, among other parameters, the coating line speed, the concentration of MBTTCL vapor in the air carrier gas and the rate of carrier gas flow.

An SIDB layer formed by the MSVD process is described in U.S. patent application Ser. No. 08/597,543 filed Feb. 1, 1996, entitled "Alkali Metal Diffusion Barrier Layer", hereby incorporated by reference, which discloses the formation of alkali metal diffusion barriers. The barrier layer disclosed therein is generally effective at thicknesses of about 20 to about 180 Å, with effectiveness increasing as the density of the barrier increases.

The PASC coatings of the present invention are usually photocatalytically activated to self-cleaning upon exposure to radiation in the ultraviolet range e.g. 300–400 nanometers (hereinafter "nm") of the electromagnetic spectrum. Sources of ultraviolet radiation include natural sources e.g. solar radiation and artificial sources such as a black light or an ultraviolet light source such as the UVA-340 light source. When using artificial ultraviolet light sources under testing conditions where it is desired to determine how the PASC coating will react the natural ultraviolet radiation, as may be appreciated, the UVA-340 light source has a photon energy distribution which more closely matches that of sunlight than does the photon energy distribution of a black light source, allowing the UVA-340 light source to be used to more closely approximate how the PASC coating performs when exposed to sunlight.

The ultraviolet radiation intensity is calibrated to an intensity of at least about 20 watts per square meter (hereinafter "W/m$^2$") at the coated surface of the coating being tested. The intensity may be calibrated, for example, with an ultraviolet meter such as that sold under the trademark BLACK-RAY® by Ultraviolet Products, Inc., of San Gabriel, Calif., under the model designation J-221. The light source is preferably positioned normal to the coating surface being tested.

The ultraviolet radiation source and the PASC coating may be positioned relative to each other such that the ultraviolet radiation passes first through the PASC coating then through the substrate (i.e. the front or "coating side"). Where the substrate passes ultraviolet radiation therethrough, the PASC coating and the ultraviolet radiation source may be positioned relative to each other such that the ultraviolet radiation passes first through the substrate and then through the PASC coating (i.e. the back or "substrate side"). In still another embodiment, one or more ultraviolet radiation source may be positioned on each side of the substrate having a PASC coating on one or both of the surfaces.

As may be appreciated, it is difficult to define with specificity a preferred ultraviolet radiation source or ultraviolet radiation intensity or ultraviolet radiation source/PASC coating/substrate relative positioning because many factors affect such considerations. These factors include, among others: the purpose for which the PASC coating is employed e.g. indoor or outdoor use; the selected ultraviolet radiation source e.g. natural or artificial; seasonal or geographic effects where the ultraviolet radiation source is natural; the desired or expected duration of ultraviolet radiation exposure; the incident angle of the ultraviolet radiation with the surface of the PASC coating; the rate of PASC activity expected or desired; the degree to which the ultraviolet radiation may be reflected or absorbed by the substrate and/or any other coatings or layers present over the substrate or over PASC coating; the contaminants sought to be removed; the thickness of the PASC coating; the composition of the PASC coating; the potential for sodium ion poisoning; and the presence or absence of an SIDB layer. However, it has been found that an ultraviolet radiation intensity within the range of about 5 to 100 W/m$^2$, preferably at least about 20 W/m$^2$, as measured at the surface of PASC coating from an ultraviolet radiation source positioned over the surface of the PASC coating will produce sufficient intensity to cause satisfactory PASC activity for many self-cleaning applications.

It is useful to be able to measure and compare the PASC effectiveness or activity of PASC coatings in order to evaluate the PASC activity of a PASC coating. A known, readily available organic contaminant may be applied over the PASC coating, and upon photocatalytically activating the PASC coating, the ability of the PASC coating to remove the organic contaminant may be observed and measured. Stearic acid, $CH_3(CH_2)_{16}COOH$, is a model organic "contaminant" to test the PASC activity of PASC coatings, because stearic acid is a carboxylic acid with a long hydrocarbon chain and is therefore a good "model molecule" for those present in common contaminants such as household oils and dirt. The stearic acid may be applied over the PASC coating as a thin test film by any convenient technique including dipping, spraying, spin coating. Generally stearic acid test films ranging from about 100 Å to about 200 Å thick provide an adequate test film. The stearic acid may be applied as a stearic acid in methanol solution and a solution having a concentration of about $6 \times 10^{-3}$ moles of stearic acid per liter of solution has been found to be satisfactory.

The PASC activity of PASC coatings may be estimated qualitatively by overcoating PASC coating with a stearic acid film (the film generally appears as a light brown coating when applied over the PASC coating) exposing the stearic acid film to ultraviolet radiation at a desired intensity for a desired interval, and examining the stearic acid film with the unaided eye for either the complete disappearance of the stearic acid test film or for a decrease in the darkness of the stearic acid film in comparison to a portion of the stearic acid film applied over the PASC coating but not exposed to ultraviolet radiation.

The PASC activity of PASC coatings may also be measured quantitatively by measuring the integrated intensity of the carbon-hydrogen (hereinafter "C—H") stretching vibrational absorption-bands of the stearic acid present on the PASC coating. The integrated intensity is commensurate with the thickness of stearic acid film remaining on the surface of the PASC coating, and removal of the stearic acid film by photocatalytically-activated self-cleaning is expected to result in a drop in the C—H stretching vibrational band intensity. The C—H bonds present in the stearic acid absorb infrared radiation which unlike ultraviolet radiation, does not photocatalytically activate the PASC coating. This absorption generally occurs between 2800 and 3000 cm$^{-1}$ wave numbers, and may be measured with a Fourier Transform Infrared Spectrophotometer (hereinafter "FTIR Spectrophotometer"). The FTIR may be equipped with a detector such as a deuterated triglycine sulface detector (hereinafter "DTGS detector") or a mercury-cadmium-telluride detector (hereinafter "MCT detector"). The MCT detector is preferred as it provides a much higher signal-to-noise ratio than the DTGS detector. This can be important where the substrate and/or other coatings in addition to the PASC coating to absorb the infrared radiation which is used by the spectrophotometer to generate the absorption spectrum. When the infrared radiation is absorbed by the substrate and/or other coatings, the intensity of the infrared radiation beam that passes through the stearic acid film, PASC coated, and substrate to the detector is significantly reduced. Combining this with the low concentration of stearic acid present on the surface of the PASC coating (which produces a very weak infrared radiation absorption feature) and the resultant infrared radiation signal is not particularly intense. Therefore, an instrument equipped with the MCT detector provides a spectrum in which the signal-to-noise ratio is about an order of magnitude higher than those equipped with DTGS detectors. When measuring the PASC activity of a stearic acid test film deposited over films and substrates through which the infrared radiation beam may pass, the infrared radiation beam may be directed through the films and substrate onto the detector positioned on the opposite side of the sample being tested. Where the films or substrates will not permit the passage of infrared radiation therethrough, the infrared radiation beam may be directed at an angle over the surface, passing through the stearic acid test film and reflecting off of the substrate as opposed to passing therethrough onto the detector. This latter method is known as reflection IR spectroscopy.

A PASC reaction rate may be determined for a PASC coating by measuring the rate at which the PASC coating reacts to remove the stearic acid film thereon when the PASC coating is exposed to actinic radiation. More particularly, the rate of decrease in the integrated intensity of the C—H stretching vibrational feature (directly proportional to surface coverage) with accumulated time of exposure to actinic (hereafter assumed to be ultraviolet) radiation provides the PASC reaction rate. For example, an initial PASC activity is measured with the FTIR spectrophotometer for a stearic acid test film present on a PASC coating. The PASC coating may or may not have been exposed to ultraviolet radiation for this initial PASC activity measurement. The stearic acid coated PASC coating is then exposed to ultraviolet radiation for a measured interval of time, at the end of which a second PASC activity measurement is made with the FTIR spectrophotometer. The integrated intensities of the C—H stretching vibrations in the second measurement is expected to be lower than in the first, due to the fact that a portion of the stearic acid test film was removed with the exposure to ultraviolet radiation. From these two measurements, a curve may be plotted of integrated intensity of C—H stretching vibrations versus time, the slope of which provides the PASC reaction rate. While two points will suffice to provide a curve, it is preferred that several measurements are taken during the course of a PASC activity measurement to provide a more accurate curve. While the duration of exposure to ultraviolet radiation between FTIR measurements may be kept constant or may be varied when accumulating more than two PASC activity measurements (as it is the cumulated time of exposure to ultraviolet radiation that is used to plot the curve), the intensity and orientation (coating side or substrate side) of the ultraviolet radiation should be kept constant for all PASC measurements taken when determining the PASC reaction rate.

The PASC reaction rate may be reported in the units of $cm^{-1}min^{-1}$, where the higher the value indicates a greater PASC activity. There is no absolute rate which renders a PASC coating "acceptable" or "unacceptable" because whether the PASC coating has an acceptable level of PASC is largely determined for the purpose for which the PASC coated article is used and the performance standards selected in connection with that purpose. For most applications, a PASC activity of at least about $2 \times 10^{-3}$, more preferably at least about $5 \times 10^{-3}$ $cm^{-1}min^{-1}$ is desired.

It is also useful to measure the thickness of the PASC coatings in order to meaningfully determine and compare the PASC activity of PASC coatings prepared in accordance with the present invention because PASC coating thickness may affect photocatalytic activity as demonstrated in the examples below. The thicknesses of the PASC coating 24 and/or SIDB layer 26, if present may be determined by either Variable Angle Spectroscopic Ellipsometry (hereinafter "VASE") or from profilometer measurements of a deletion edge in the measured film, or may be estimated from interference colors, as is known in the art.

The particle size of the PASC coating 24 and/or SIDB layer 26, if present may be calculated from X-ray Diffraction (hereinafter "XRD") data using the Scherrer relationship. This relationship is known in the art and a discussion of it may be found in Chapter 9 of *X-RAY DIFFRACTION PROCEDURES FOR POLYCRYSTALLINE AND AMORPHOUS MATERIALS*, Klug and Alexander, John Wiley & Sons, Inc. (1954).

The following examples of the present invention are presented for illustration and the invention is not limited thereto.

EXAMPLE 1

2100 Å Thick PASC Coating Formed by the CVD Process

Figure 3:
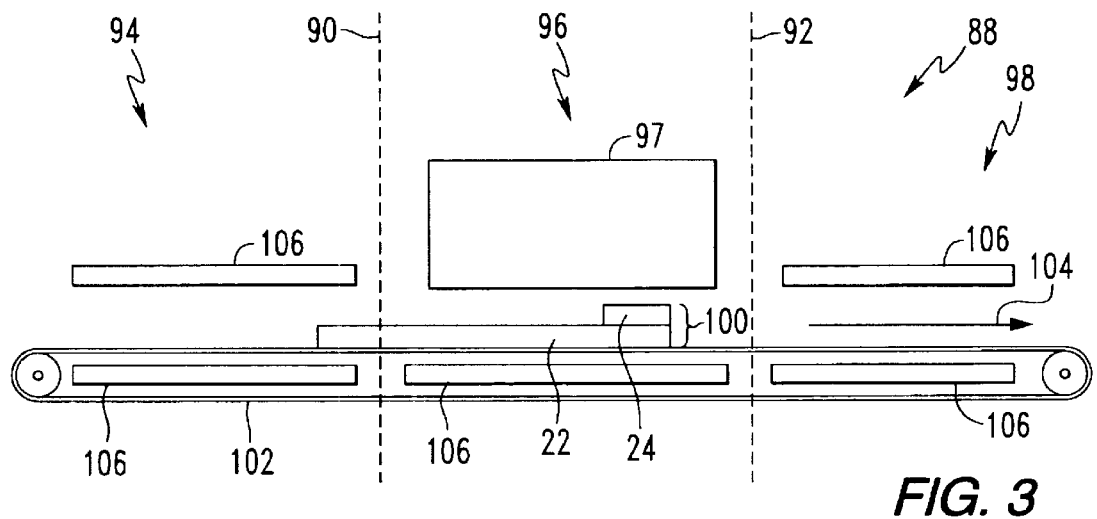
FIG. 3 is a schematic view of selected components of a CVD coater.

The PASC activity of a titanium dioxide PASC coating having a thickness of about 2100 Å was investigated as follows. A PASC coating was deposited using the CVD process on substrate 22 which was the air side of a piece of soda-lime-silica float glass sold under the trademark SOLEX® glass by PPG Industries, Inc., of Pittsburgh, Pa. With reference to FIG. 3, the piece of Solex® glass measured approximately 5.5 inches wide by 12 inches long by 0.016 inches thick (14 cm wide by 30.5 cm long by 0.4 cm thick) and was coated with a titanium dioxide PASC coating using a CVD coater 88 as shown in FIG. 3. The CVD coater 88 generally consists of three zones shown in FIG. 3 separated by vertical dashed lines 90 and 92. The three zones include a preheat zone 94, a coating zone 96 and an annealing zone 98. The piece of Solex® glass, designated hereinafter as substrate 22, was moved through the three zones on an endless conveyor 102 in the direction of arrow 104.

The substrate 22 was moved into the preheat zone 94 and was preheated to a temperature of about 649° C. (about 1200° F.) by a plurality of heaters 106 spaced above and below the conveyor 102. The substrate 22 was moved by the conveyor 102 into the CVD coating zone 96. As may be appreciated, the CVD coating zone 96 includes at least one coating unit 97. In order to deposit more than one coating in succession, coating zone 96 may include a plurality coating units 97. The coating unit 97 includes supporting sub-systems and controls such as a gas delivery sub-system, a liquid delivery sub-system, temperature controls, an exhaust sub-system and controls and a temperature and pressure monitoring sub-system, none of which is shown. The gas delivery sub-system controls the flow of carrier gas to the surface of the substrate 22. Nitrogen gas was used as a carrier gas. The inlet nitrogen stream was controlled to a temperature of 113° C. (about 235° F.) by heaters not shown. $NH_3$ was included in the carrier gas at 20% of the total flow rate. The exhaust flow rate was 125% match of the inlet flow rate. The metal-containing precursor used to deposit the titanium dioxide PASC coating on the substrate 22 was TTIP which was present at 0.4% by volume of total flow and was also supplied at a temperature of about 113° C. (about 235° F.). The total flow of $N_2$, $NH_3$ and TTIP vapor through the CVD coater 88 was 75 standard liters per minute (slm). The line speed of the conveyor 102 was about 50 inches (127 cm) per minute, and the coating unit slot width was about 3/16 inch (0.48 cm). The substrate 22 was maintained at a temperature of about 554° C. (1030° F.) while under the coating unit 97, while a coating 24 was deposited on the substrate 22 to form coated sample 100. An approximately 2100 Å thick (as measured by VASE) titanium dioxide PASC coating 24 was formed on coated sample 100.

The coated sample 100 was then advanced to the annealing zone 98 where it was annealed from an initial temperature of about 549° C. (1020° F.) to a final temperature of about 121° C. (250° F.) over a period of about 26 minutes.

The PASC coated sample 100 was subjected to XRD analysis. The particle size of the PASC coating 24 was determined to be about 309 Å as calculated using the Scherrer relationship. The coated sample 100 showed strong peaks in the XRD pattern corresponding to anatase titanium dioxide.

The PASC coated sample 100 was then overcoated with a stearic acid test film to measure its photocatalytic activity. A stearic acid/methanol solution having a concentration of about $6\times10^{-3}$ moles of stearic acid per liter of solution was applied by pipetting the stearic acid solution at a rate of about 2 ml/10 seconds over the center of the sample 100, while the coated sample 100 was spinning at a rate of about 1000 revolutions per minutes, whereupon the stearic acid flowed across the surface of the coated sample 100, by centrifugal force to provide a stearic acid film of generally uniform thickness on the surface of the coated sample 100, ranging from about 100 to 200 Å in thickness. The term "generally" is used in the foregoing because the thickness of the stearic acid layer was not constant along the length of the coated sample 100, but was thickest at the ends of the coated sample 100 and thinnest at the center of the coated sample 100 due to the applied centrifugal force. As may be appreciated, the described stearic acid solution concentrations, spin rate, sample size and pipetting rate may be modified to obtain stearic acid coatings of desired thicknesses. Under the above-described parameters, the average thickness of the stearic acid test film was about 150 Å, as determined by calibration of IR intensity with quartz crystal microbalance.

The stearic acid test film/titanium dioxide PASC coated sample 100 was exposed to ultraviolet radiation from a black light source normal to coating side of the coated sample 100, providing an intensity of about 20 W/m² at the surface of the PASC coating 24 for about a cumulated 30 minutes to induce photocatalytically-activated self-cleaning of the stearic acid test film. Periodic FTIR spectrophotometer measurements were made over the cumulated 30 minute ultraviolet light exposure period using an FTIR spectrophotometer equipped with an MCT detector to quantitatively measure photocatalytic activity. More particularly, the stearic acid test film/PASC coated sample 100 was exposed to ultraviolet radiation for a measured period of time, after which the coated sample 100 was placed in the FTIR spectrophotometer where the integrated area under the C—H absorption band of stearic acid was measured to determine PASC activity. The coated sample 100 was again exposed to ultraviolet radiation for an additional measured period of time to remove additional stearic acid, after which another FTIR measurement was made. This process was repeated, and a plot of the integrated IR absorption intensity of the C—H stretching vibrations versus cumulated time of exposure to ultraviolet light was obtained, the slope of which provided the PASC rate for the stearic acid test film/titanium dioxide PASC coated sample 100. As may be appreciated, all FTIR measurements were taken over about the same area of coated sample 100 in order to minimized the affect of variations in the thickness of the stearic acid test film as described above. The photocatalytic reaction rate was determined to be $3.53\times10^{-3}$ cm$^{-1}$min$^{-1}$ which is approaching the values for PASC coated substrates which contain little or no sodium ions (e.g. quartz glass substrates) indicating that the 2100 Å thickness of the titanium dioxide PASC coating was sufficient to overcome sodium ion poisoning.

EXAMPLE 2

700–800 Å Thick PASC Coating Formed by the CVD Process

A titanium dioxide PASC coating 24 having a thickness of about 700–800 Å was deposited on a glass substrate via the CVD process in the same manner as in Example 1, with the following exceptions.

The glass composition used in Example 2 was 3 mm (0.12 inch) thick clear (i.e. low iron soda lime silica) glass. The preheat temperature of Example 2 was 593° C. (1100° F.). The TTIP concentration in Example 2 was 0.1% with a total flow rate of 50 slm. $NH_3$ was included in the carrier gas at 24% of the total flow rate. The line speed was 30 inches per minute (76.2 cm per minute). The slot width was ¹⁄₁₆ inch. The thickness of the titanium dioxide PASC coating 24 was estimated from interference colors, a technique known in the art of thin film thickness measurement, and determined to be within the range of about 700 to 800 Angstroms.

A stearic acid test film was applied over the titanium dioxide PASC coating in the same manner as set forth in Example 1, and after exposure to UV light in the manner described in Example 1 with periodic FTIR spectrophotometer measurements of PASC activity over a 33-hour cumulative period. The photocatalytic reaction rate was determined to be about $0.17\times10^{-3}$ cm$^{-1}$min$^{-1}$.

The decreased PASC activity of Example 2 is believed to arise from the difference in titanium dioxide coating thickness between Examples 1 and 2, (about 2100 Å versus about 700–800 Å, respectively) More particularly, it is believed that the PASC reaction rate of Example 2 was lower than that of Example 1 due to the increased depth of sodium ion diffusion into the titanium dioxide coating of Example 2 as a larger percentage of the total thickness of the titanium dioxide PASC coating for the titanium dioxide PASC coating of Example 2 than that of Example 1. It is believed that sodium ions migrated from the glass sample into the PASC coating of Example 2 in annealing zone 98. One conclusion that may be drawn from a comparison of Examples 1 and 2 is that in the absence of an SIDB layer, thicker PASC coatings are less susceptible to sodium ion poisoning, thus maintaining higher PASC activity.

EXAMPLE 3

PASC Coating Over an SIDB Layer Formed by the CVD Process

In this example the affect of the presence of a tin dioxide SIDB layer on PASC activity was investigated. More particularly a tin dioxide SIDB layer was formed over the air side of four pieces of float glass and certain physical characteristics of the SIDB layer were investigated. Thereafter, sixteen additional pieces of float glass were provided with a tin dioxide SIDB layer by the CVD process, each of which tin dioxide SIDB layer was in turn overcoated with a titanium dioxide PASC coating by the CVD process. One sample was cut from each of the sixteen PASC coated/SIDB layer coated/float glass pieces, and these sixteen samples were overcoated with a stearic acid test film. The sixteen stearic acid test film coated/titanium dioxide PASC coated/tin dioxide SIDB layer coated/samples were exposed to ultraviolet radiation and the PASC reaction rates for the samples were determined.

3A. Investigation of SIDB Layer

An SIDB layer was deposited via the CVD process using the CVD apparatus described in Example 1 on the air side of four pieces of glass cut from a soda-lime-silica float glass ribbon which measured about 5 inches by 12 inches by 0.16 inch thick (12.7 cm by 30.48 cm by 0.4 cm). More particularly, the SIDB layer was a tin dioxide SIDB layer and the affect of the metal-containing precursor concentration, water vapor concentration, CVD line speed, preheat temperatures and SIDB layer thickness on the tin dioxide SIDB layer were investigated. The metal-containing precursor used to form the tin oxide SIDB layer by the CVD process on all four glass pieces was a MBTTCL vapor, which was mixed with water vapor in an air carrier gas.

A first of the four glass pieces was coated by the CVD process and apparatus of Example 1 with a tin oxide SIDB layer by directing an MBTTCL vapor at about a 1.5% concentration and a water vapor concentration of about 1.5% in an air carrier gas toward the air side of the glass piece. The preheat temperature was about 648° C. (1200° F.) and the line speed was about 50 inches (127 cm) per minute for this glass piece. The tin oxide SIDB layer formed thereby was about 3500 Å thick as determined by VASE. The resistivity and particle size of the SIDB layer were measured and found to be about $4.6 \times 10^{-3}$ ohm-cm and 198 Å respectively.

A second glass piece was similarly coated with a tin oxide SIDB layer, however the line speed was decreased to about 20 inches (50.8 cm) per minute and the MBTTCL vapor concentration was decreased to about 0.5% and the water vapor concentration was decreased to about 0.5% in the air carrier gas. The preheat temperature was maintained at about 648° C. (1200° F.). The tin oxide SIDB layer formed thereby was about 4340 Å thick as determined by VASE. The resistivity was found to be about $3.9 \times 10^{-3}$ ohm-cm and particle size was about 185 Å.

A third of the glass pieces was similarly coated with a tin oxide SIDB layer, however, preheat temperature was decreased to about 480° C. (900° F.), while the line speed was increased to about 50 inches (127 cm) per minute. The MBTTCL concentration was about 1.5%, water vapor concentration about 1.5% in an air carrier gas. The resulting tin oxide SIDB layer had a coating thickness of about 1000 Å as determined by VASE and had a resistivity of about $3.8 \times 10^{-2}$ ohm-cm and a particle size of about 59 Å.

A fourth glass piece was similarly coated with a tin oxide SIDB layer, however while the preheat temperature was maintained at about 480° C. (900° F.), the line speed was decreased 20 inches (50.8 cm) per minute. MBTTCL concentration was about 0.5%, and water concentration was about 0.5 in an air carrier gas. The tin oxide SIDB layer was about 1010 Å thick as determined by VASE, and had a resistivity of about $2 \times 10^{-2}$ ohm-cm and a particle size of about 78 Å.

From the foregoing it was concluded that within the temperature ranges, concentrations, line speeds and SIDB layer thicknesses set forth, while resistivity or particle size may vary, all four glass pieces were found to have had a cassiterite structure.

3B. Formation of Titanium Dioxide PASC Coating Formed Over Tin Oxide SIDB Layer by the CVD Process Sixteen additional float glass pieces measuring 5 inches by 12 inches by 0.16 inch thick (12.7 cm by 30.48 cm by 0.4 cm) were each coated with the CVD coater and process as generally described in Example 3A with a tin oxide SIDB layer and were then further coated with a titanium dioxide PASC coating using the CVD coating apparatus and process as generally described in Example 1. For this coating operation, the on-line CVD process used a pair of consecutive coating units (one for the SIDB layer and one for the PASC coating). The PASC coating over the SIDB layer makes separate analysis of the SIDB layer difficult if not impossible, therefore, it was assumed that the PASC overcoated tin oxide layers had the same properties as the non overcoated tin oxide layers described in Section 3A above, although both the SIDB layers and the PASC coatings were applied to the sixteen glass pieces under a variety of specific coating parameters as described in detail below and as set forth in Table 1 below.

Generally, the sixteen tin oxide SIDB layers were deposited from a metal-containing precursor of a MBTTCL vapor in an air carrier gas mixed with water vapor, also carried in air. The MBTTCL vapor temperature was maintained at about 160° C. (320° F.). The total flow rate was 60 slm, and the exhaust matching ratio was 115%. The slot width was 0.16 cm (1/16 inch). The specific coating parameters which were varied for the SIDB layers formed in this example included preheat zone 94 temperature, line speed, MBTTCL concentration, water vapor concentration and SIDB layer thickness. Shown in Table 1 below are the tin dioxide SIDB layer coating parameters and expected SIDB layer thicknesses for each of the sixteen glass pieces. Actual thickness measurements were not taken; expected thicknesses are based on the results obtained in section 3A above. The sixteen pieces are separated in Table 1 into four groups of four substrates each, based upon preheat temperature and line speed.

TABLE 1

$SnO_2$ SODIUM ION DIFFUSION BARRIER LAYER CVD COATING PARAMETERS

| Group No. | Sample No. | Preheat Temp. °F. | Line Speed in/min | $H_2O$ Conc Vol. % | MBTTCL Conc % | Expected SIDB Layer Thickness Å |
|---|---|---|---|---|---|---|
| I | 1 | 900 | 20 | 0.5 | 0.5 | 1010 |
|  | 2 | 900 | 20 | 0.5 | 0.5 | 1010 |
|  | 3 | 900 | 20 | 0.5 | 0.5 | 1010 |
|  | 4 | 900 | 20 | 0.5 | 0.5 | 1010 |
| II | 5 | 900 | 50 | 1.5 | 1.5 | 1000 |
|  | 6 | 900 | 50 | 1.5 | 1.5 | 1000 |
|  | 7 | 900 | 50 | 1.5 | 1.5 | 1000 |
|  | 8 | 900 | 50 | 1.5 | 1.5 | 1000 |
| III | 9 | 1200 | 20 | 0.5 | 0.5 | 4340 |
|  | 10 | 1200 | 20 | 0.5 | 0.5 | 4340 |
|  | 11 | 1200 | 20 | 0.5 | 0.5 | 4340 |
|  | 12 | 1200 | 20 | 0.5 | 0.5 | 4340 |
| IV | 13 | 1200 | 50 | 1.5 | 1.5 | 3500 |
|  | 14 | 1200 | 50 | 1.5 | 1.5 | 3500 |
|  | 15 | 1200 | 50 | 1.5 | 1.5 | 3500 |
|  | 16 | 1200 | 50 | 1.5 | 1.5 | 3500 |

Each of the SIDB coated sixteen glass pieces was in turn overcoated with a titanium dioxide PASC coating deposited from the second CVD coating unit located downstream of the first SIDB coating unit through which a metal-containing precursor of TTIP vapor carrier in a nitrogen ($N_2$) carrier gas was directed over the SIDB layer coated surface of the glass pieces. Ammonia ($NH_3$) was added to the TTIP/carrier gas mixture of eight of the sixteen glass pieces. The carrier gas for all sixteen pieces was maintained at a temperature of about 113° C. (235° F.). The sixteen pieces were annealed as in Example 1. The TTIP vaporizer temperature was maintained at about 104.4° C. (220° F.). Shown in Table 2 below are the titanium dioxide PASC coating parameters for the sixteen glass pieces. The sixteen glass pieces are separated in Table 2 into four groups of four pieces each based upon preheat temperature and line speed.

TABLE 2

TiO₂ PHOTOCATALYTICALLY-ACTIVATED SELF-CLEANING COATING PARAMETER

| Group No. | Sample No. | Preheat Temp. °F.* | Line Speed in/min | Total Flow Rate L/min | Exhaust Matching % | TTIP Conc. % | NH₃ Conc. % | Slot Width Inches |
|---|---|---|---|---|---|---|---|---|
| I | 1 | 900 | 20 | 35 | 105 | 0.1 | 0 | 1/16 |
|  | 2 | 900 | 20 | 75 | 105 | 0.4 | 0 | 3/16 |
|  | 3 | 900 | 20 | 35 | 125 | 0.4 | 20 | 1/16 |
|  | 4 | 900 | 20 | 75 | 125 | 0.1 | 20 | 3/16 |
| II | 5 | 900 | 50 | 75 | 125 | 0.4 | 0 | 1/16 |
|  | 6 | 900 | 50 | 35 | 125 | 0.1 | 0 | 3/16 |
|  | 7 | 900 | 50 | 75 | 105 | 0.1 | 20 | 1/16 |
|  | 8 | 900 | 50 | 35 | 105 | 0.4 | 20 | 3/16 |
| III | 9 | 1200 | 20 | 75 | 125 | 0.1 | 0 | 1/16 |
|  | 10 | 1200 | 20 | 35 | 125 | 0.4 | 0 | 3/16 |
|  | 11 | 1200 | 20 | 75 | 105 | 0.4 | 20 | 1/16 |
|  | 12 | 1200 | 20 | 35 | 105 | 0.1 | 20 | 3/16 |
| IV | 13 | 1200 | 50 | 35 | 105 | 0.4 | 0 | 1/16 |
|  | 14 | 1200 | 50 | 75 | 105 | 0.1 | 0 | 3/16 |
|  | 15 | 1200 | 50 | 35 | 125 | 0.1 | 20 | 1/16 |
|  | 16 | 1200 | 50 | 75 | 125 | 0.4 | 20 | 3/16 |

*Preheat temperature here refers to the temperature of preheat zone 94. There was only one preheat operation, and the preheat temperatures listed are the same preheat temperatures to which the glass pieces were raised in the preheat zone as they moved through CVD coater 88 and first received the SIDB layer followed by the PASC coating, before entering the annealing zone 98.

Shown in Table 3 below are selected properties of each of the sixteen glass pieces after the PASC coating as described in Table 2 was applied. PASC coating thicknesses were not measured, but is expected to vary within each group due to variations in other deposition parameters such as line speed and precursor concentration. However, surface roughness and particle size of the PASC coating were determined in order to relate PASC activity to roughness and particle size. Surface roughness measurements were estimated based upon Atomic Force Microscope (hereinafter "AFM") measurements made of the PASC coating. It was found that there was a large variation in surface roughness and particle size and crystalline phase as a function of preheat temperature.

TiO₂ PHOTOCATALYTICALLY-ACTIVATED SELF-CLEANING COATING PROPERTIES

| Group No. | Sample No. | Surface Roughness Rms | Particle Size Å | Crystalline Phase |
|---|---|---|---|---|
| I | 1 | 4.13 | * | not detected |
|  | 2 | 5.18 | * | not detected |
|  | 3 | 7.87 | * | anatase/rutile |
|  | 4 | 7.84 | * | anatase/rutile |
| II | 5 | 6.39 | * | not detected |
|  | 6 | 4.38 | * | not detected |
|  | 7 | 5.99 | * | anatase/rutile |
|  | 8 | 7.50 | * | not detected |
| III | 9 | 14.71 | * | not detected |
|  | 10 | 15.58 | 277 | anatase |
|  | 11 | 23.08 | 121 | anatase |
|  | 12 | 16.93 | 166 | anatase |
| IV | 13 | 13.13 | 216 | anatase |
|  | 14 | 15.72 | * | not detected |
|  | 15 | 14.52 | * | weak anatase |
|  | 16 | 15.93 | 154 | anatase |

*Particle size could not be calculated because either no peaks were detected for the anatase phase in the X-ray diffraction pattern (Samples 1, 2, 5, 6, 8, 9 and 14) or the peaks were too broad and weak to measure (Samples 3, 4, 7 and 15).

3C. Description of Testing of PASC Activity of the Sixteen Substrates

A 1 inch by 4 inch (2.54 cm×10.16 cm) sample or test strip was cut out of the center of each of the sixteen PASC coated/SIDB coated glass pieces. Each of the sixteen test strips was overcoated by spin coating with a stearic acid test film as described in Example 1. The sixteen test strips were then subjected to ultraviolet radiation from a black light source at an intensity of 20 W/m² over a 7-hour cumulative time period to induce photocatalytically-activated self-cleaning of the stearic acid test film.

Because the thickness of the stearic acid test film was found to vary along the length of the 1 inch by 4 inch (2.54 cm×10.16 cm) test strips (i.e. a thicker stearic acid test film at each end of the test strips with a thinner stearic acid test film toward the center of each test strip, due to the centrifugal force affecting the stearic acid as it was dropped onto the center of spinning test strips as described above and as observed visually by changes in interference colors along the length of the test strips), photocatalytic activity was measured at each end of each of the sixteen test strips using the FTIR Spectrophotometer equipped with the MCT detector. The PASC reaction rates obtained from FTIR spectroscopy tests for each pair of tests conducted on each of the sixteen test strips are shown in Table 4.

TABLE 4

PHOTOCATALYTICALLY-ACTIVATED SELF-CLEANING ACTIVITY OF SIXTEEN TEST STRIPS

| Group No. | Sample No. | PASC Activity Rate Left Side of Test Strip × 10⁻³ cm⁻¹min⁻¹ | PASC Activity Right Side of Test Strip × 10⁻³ cm⁻¹min⁻¹ |
|---|---|---|---|
| I | 2 | 0.39 | 0.45 |
|  | 2 | 0.32 | 0.28 |
|  | 3 | 0.26 | 0.31 |
|  | 4 | 0.4 | 0.39 |
| II | 5 | 0.5 | 0.57 |
|  | 6 | 0.23 | 0.14 |
|  | 7 | 0.27 | 0.22 |
|  | 8 | 0.014 | 0.019 |

TABLE 4-continued

PHOTOCATALYTICALLY-ACTIVATED SELF-CLEANING
ACTIVITY OF SIXTEEN TEST STRIPS

| Group No. | Sample No. | PASC Activity Rate Left Side of Test Strip × $10^{-3}$ cm$^{-1}$min$^{-1}$ | PASC Activity Right Side of Test Strip × $10^{-3}$ cm$^{-1}$min$^{-1}$ |
|---|---|---|---|
| III | 9 | 0.23 | 0.048 |
|  | 10 | 0.96 | 0.77 |
|  | 11 | 0.4 | 0.31 |
|  | 12 | 0.52 | 0.43 |
| IV | 13 | 1.18 | 0.94 |
|  | 14 | 0.73 | 0.77 |
|  | 15 | 0.42 | 0.41 |
|  | 16 | 0.25 | 0.35 |

It is evident from Table 4 that for certain test strips there is a very significant difference in the activities between two ends of the test strip. This difference is believed to be related to non-uniformity of the thickness of the stearic acid layer on the test strip.

Referring to Table 4, there appears to be a lack of correlation between deposition conditions and PASC activity of the PASC coating over the SIDB layer. The three most active test strips as shown on Table 4 are Samples 13, 10 and 14 based on the activities of the left sides of the test strips. These strips 13, 10 and 14 correspond to the higher preheat temperature of 1200° F. (648.8° C.). If ranked by PASC activity, the remaining 13 test strips show a mix of preheat temperatures, as well as other coating parameters in the ranking indicating that the presence of a sodium ion diffusion barrier layer may operate to prevent sodium ion poisoning of the PASC coating layer, and may permit greater latitude in coating conditions and parameters while still obtaining photocatalytic activity.

preheat zone 120 and a pyrolytic spray zone 122. A glass piece 126 was conveyed on a conveyor not shown into the preheat zone 120 where it was heated by a plurality of electric heaters 130 to a temperature in the range of about 600° to 700° C. (1112° F. to 1292° F.). The glass piece 126 was then conveyed past an oscillating spray nozzle 132, which was positioned about 10 inches (25.4 cm) above the air side of the glass piece 126. An aqueous suspension of organometallic coating reactants 134 was maintained in suspension by agitator 136 in mixing chamber 138. The aqueous suspension 134 was moved through tubing 140 to spray nozzle 132 where it was mixed with compressed air in any convenient manner (from a compressed air source 142 which was moved to spray nozzle 132 by tubing 144). A spray pattern 146 was formed as the aqueous suspension 134/compressed air mixture was sprayed from nozzle 132 onto the surface of the glass piece 126 and was pyrolyzed to form PASC coating 24 on the glass piece 126. The PASC coated glass piece 126 was allowed to cool in air.

For this example, the organometallic coating reactant selected was titanyl acetylacetonate and the rate of aqueous suspension delivered to the surface of the three glass pieces 126 was controlled so as to provide a PASC coating thickness on each glass piece. The thicknesses were 400 Å, 725 Å and 1000 Å. All other coating parameters were held constant to determine the effect of PASC coating thickness on photocatalytic activity for a titanium dioxide PASC coating deposited by spray pyrolysis on clear float glass without an SIDB barrier layer.

Table 5 sets forth the specific coating parameters for this example.

TABLE 5

COATING PARAMETERS FOR SPRAY PYROLYSIS
OF TITANIUM DIOXIDE PASC COATING

| Sample No. | Line Speed in/min | Coating Reactant | Concentration of Organometallic gms/l or rate | Delivery Rate ml/min | Atomizing Air Pressure lbs/in$^2$ | Deposition Temp. ° C. | TiO$_2$ Thickness Å | PASC Activity × $10^{-3}$cm$^{-1}$min$^{-1}$ |
|---|---|---|---|---|---|---|---|---|
| A | 75 | titanyl acetyl-acetonate | 20 gms/ml | 40 ml/min | 50 | 672 | 400 | 2 |
| B | 75 | titanyl acetyl-acetonate | 20 gms/ml | 55 ml/min | 50 | 677 | 725 | 2 |
| C | 75 | titanyl acetyl-acetonate | 27 gms/ml | 67 ml/min | 50 | 688 | 1000 | 3 |

EXAMPLE 4

PASC Coating Formed by Spray Pyrolysis

In this example, glass pieces were coated by spray pyrolysis with titanium dioxide PASC coatings of differing thickness to investigate the affect of PASC coating thickness on PASC activity.

Three float glass pieces each 4 inch×4 inch×0.16 inch thick (10.16 cm×10.16 cm×4 mm) had the air side coated by spray pyrolysis with a titanium dioxide PASC coating.

Figure 4:
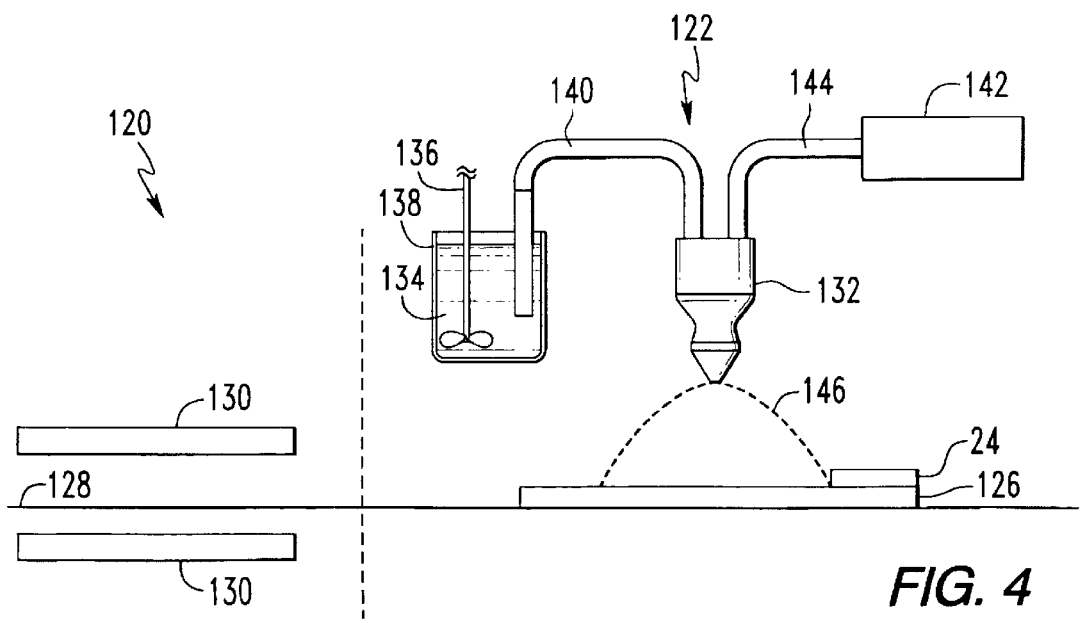
FIG. 4 is a schematic view of selected components of a spray pyrolysis coater.

The basic components of the pyrolytic spray equipment used to apply the PASC coating over the glass pieces are shown in FIG. 4. The spray pyrolysis equipment included a After deposition of the titanium dioxide PASC coating, each of the three glass pieces was cut into four 1 inch×4 inch (2.54 cm×10.16 cm) test strips providing a total of 12 test strips.

One test strip from each of the three original glass pieces respectively was subjected to x-ray diffraction analysis. From this analysis all of the three glass pieces in this example were found by x-ray diffraction analysis to have strong x-ray diffraction lines matching anatase titanium dioxide.

To evaluate photocatalytic activity for the three glass pieces, one test strip from each of the three glass pieces respectively was overcoated with a stearic acid test film by the process described in Example 1. The three test strips were then exposed to ultraviolet radiation from a black light source positioned normal to the coated side of each test strip at an intensity of 20 W/m² over a seven hour cumulative time period. The photocatalytic reaction rate of each of the three test strips was determined quantitatively by FTIR spectroscopy using an MCT detector, as described above. The photocatalytic reaction rate for the three glass pieces is shown in Table 5.

From the foregoing it may be concluded that low but acceptable photocatalytic reaction rates may be obtained with PASC coatings formed by the spray pyrolysis technique, without sodium ion poisoning of the PASC coating. It may also be concluded that thicker PASC coatings give rise to higher PASC activity, as demonstrated by Sample C in Table 5.

EXAMPLE 5
Comparison of PASC Coatings Formed by Spray Pyrolysis with and without SIDB Layer and Investigation of the Affect of Post-PASC Coating Annealing In this experimental matrix eight glass pieces were provided with a PASC coating by the spray pyrolysis method to evaluate the effect of the presence and absence of an SIDB layer, the effect of PASC coating thickness and the effect of substrate temperature during deposition of the PASC coating on the PASC reaction rate of PASC coatings.

More particularly, the air side of four of the eight glass pieces of 4 mm Solex® float glass were each coated with a 500 Å thick tin dioxide SIDB layer which had been deposited by spray pyrolysis from an aqueous suspension of dibutyltindifluoride, $(C_4H_9)_2SnF_2$ and a wetting agent. The tin dioxide SIDB layer was applied with the spray pyrolysis equipment and procedure described in Example 4. After coating with the SIDB layer, the glass samples were cooled to room temperature, these four glass pieces and the remaining four glass pieces were each coated with a titanium dioxide PASC coating over the SIDB layer, and were cooled to room temperature. It should be noted that the four SIDB layer coated glass pieces which were cooled to room temperature between the application of the SIDB layer and the PASC coating and then reheated prior to the application of the PASC coating, were prepared in this fashion because the laboratory pyrolytic spray equipment used in the experiment had only one spray pyrolysis station, thereby requiring changeover from a dibutyltin difluoride suspension (to provide the SIDB layer) to a titanyl acetylacetonate suspension (to provide the PASC coating). Such an intermediate cooling step would be eliminated in a preferred coater, e.g. two spray pyrolysis stations would be provided to sequentially coat an SIDB layer and a PASC coating to a moving substrate, such as a continuous float ribbon of glass, without any such intermediate cooling step.

After all eight PASC coated glass pieces were cooled to room temperature, the glass pieces were overcoated with a stearic acid film described in Example 1 and the films were then exposed to ultraviolet radiation with a UVA 340 light source placed normal to the coating side of the stearic acid test film/PASC coated glass pieces to provide 20 W/m² intensity at the PASC coating surface. The PASC reaction rate for the removal of the stearic acid test film was determined quantitatively using the process as described in Example 1. This PASC reaction rate is recorded in Table 6 below under the column headed 0.00 min. It is to be noted that the 0.00 minute parameter refers to the fact that the glass piece having the PASC coating thereon after it was allowed to cool to room temperature and was not annealed; it does not refer to the accumulated time period of ultraviolet exposure.

The affect of annealing time on stearic acid removal was examined as follows. The residual stearic acid test film was washed off of the PASC coating of each of the eight glass pieces by wiping the surfaces with a methanol soaked wiping cloth until no stearic acid film or haze was observed. Each of the eight glass pieces was then in turn respectively placed in a furnace maintained at about 500° C. (932° F.) for about 3 minutes to heat the respective glass piece. The furnace heat was turned off, the furnace door was opened, and the respective glass piece was allowed to cool in the furnace to about room temperature. The slow cooling rate within the furnace provided the anneal. Each respective glass piece was then overcoated with a new stearic acid test film, exposed to ultraviolet radiation and the PASC reaction rate was determined in the same fashion as the non-annealed PASC coating described immediately above in this example. The residual stearic acid test film was again washed off the surface of each respective glass piece as described above, and respective each glass piece was subjected to additional heating for a ten minute period and allowed to slowly cool in the furnace in the same fashion, resulting in a 13 minute accumulated heating time period, whereupon a stearic acid test film was reapplied as described and the PASC reaction rate was determined as set forth above. The process was repeated yet another time to obtain a 73 minute accumulated heating time period followed by slow cooling in the furnace to provide the anneal.

The SIDB layer and PASC coating properties and PASC reaction rates versus accumulative annealing time period for the eight glass pieces (D–K) are shown in the following Table 6.

TABLE 6

PHOTOCATALYTIC ACTIVITY REACTION RATES OF PASC COATINGS WITH AND WITHOUT SODIUM-ION DIFFUSION BARRIER LAYER

| Sample | Barrier Layer | TiO₂ Thickness | TiO₂ Coating Glass Temp. During | Photocatalytic Activity* After Annealing at 500° C. | | | |
|---|---|---|---|---|---|---|---|
| | | | | 0.00** min | 3 min | 13 min | 73 min |
| D | None | 400Å | 1145° F. | 0.72 | 1.05 | 1.94 | *** |
| E | None | 625Å | 1145° F. | 0.69 | 1.05 | 1.67 | 2.97 |
| F | 500Å SnO₂ | 400Å | 1147° F. | 2.39 | 5.02 | 7.39 | *** |

TABLE 6-continued

PHOTOCATALYTIC ACTIVITY REACTION RATES OF PASC COATINGS
WITH AND WITHOUT SODIUM-ION DIFFUSION BARRIER LAYER

| Sample | Barrier Layer | $TiO_2$ Thickness | $TiO_2$ Coating Glass Temp. During | Photocatalytic Activity* After Annealing at 500° C. | | | |
|---|---|---|---|---|---|---|---|
| | | | | 0.00** min | 3 min | 13 min | 73 min |
| G | 500Å $SnO_2$ | 625Å | 1152° F. | 2.23 | 5.35 | 8.74 | 5.13 |
| H | None | 400Å | 1260° F. | 2.05 | 6.59 | 5.14 | *** |
| I | None | 625Å | 1260° F. | 4.71 | 7.99 | 9.95 | 5.39 |
| J | 500Å $SnO_2$ | 400Å | 1300° F. | 2.4 | 5.26 | 3.73 | *** |
| K | 500Å $SnO_2$ | 625Å | 1280° F. | 4.64 | 12.29 | 5.57 | 4.4 |

*PASC reaction rate for removal of stearic acid ($\times 10^{-3}$ $cm^{-1}min^{-1}$)

The results of the photocatalytic analysis shown in Table 6 suggest that a titanium dioxide layer thickness of about 625 Å with no barrier layer (Sample I) can approach the PASC activity of a thinner 400 Å PASC coating over an SIDB layer (Sample J). It should be noted that for Samples J, the SIDB layer underwent an intermediate cooling and subsequent reheating operation described, which reheating operation may have reduced the SIDB layer effectiveness for Sample J, which might otherwise have had a higher PASC activity.

Sample K of Table 6 also shows the significant impact annealing time can have on PASC reaction rate. After 3 minutes anneal time the PASC activity of Sample K rose from about 4.64 to about 12.29×10$^{-3}$ cm$^{-1}$min$^{-1}$ but subsequently dropped with additional annealing. It is believed that the anatase phase of the titanium dioxide PASC coating was forming during annealing when the 3 minute time period PASC activity was measured and was forming without appreciable sodium ion poisoning due to the presence of the tin oxide in the SIDB layer. While not wishing to be bound to this particular theory, it is believed that continuing to anneal for too long a cumulated time period may induce sodium ion poisoning, despite the presence of the SIDB layer which would account for the decline in PASC activity of Sample K.

The above examples are offered to illustrate the present invention and are not intended to limit the invention.

While the above described methods of providing a PASC coating have been described in connection with providing such coatings on a continuous moving substrate e.g. a continuous float ribbon of glass during manufacture of the substrate, it is to be understood that these methods could also be utilized downstream of the substrate manufacturing process. For example, the PASC coatings could be provided on substrates including but not limited to glass substrates, as part of the processes to bend and/or temper the substrate. For example, where a glass substrate is heated for subsequent bending and/or tempering, the PASC coating with or without a SIDB layer may be applied by the spray pyrolysis or CVD or MSVD techniques described above prior to bending/tempering. The CVD and spray pyrolysis methods may be used as the glass substrate is heated to bending/tempering temperatures. The PASC coating, with or without an SIDB layer may be applied to the glass substrate in a post bending/tempering reheating operation by any of the CVD, spray pyrolysis or MSVD methods.

It is believed that there are differences in the PASC coatings prepared by the sol-gel process and those prepared by the above-described methods. For example, it is expected that the PASC coatings prepared by the sol-gel process may be more porous, less dense, generally thicker, generally less applicable for use in a transparency and may tend to contain more OH groups than those prepared by the CVD or spray pyrolysis processes. As noted above, excess OH groups are undesirable because they may inhibit proper crystalline formation in the PASC coating which may in turn reduce PASC activity. It is expected that PASC coatings prepared by the CVD or spray pyrolysis methods would have a finer grain structure than those prepared by the sol-gel process.

Advantages of the present invention over the sol-gel method of forming PASC coatings include an ability to form a thin dense PASC film on a substrate as opposed to the much thicker, porous coatings obtained with the sol-gel coating method. Because the PASC coatings of the present invention are thin, they are aesthetically acceptable for use as a transparent coating on glass substrates. Still another advantage is that the method of providing a PASC coating according to the present invention avoids the need to reheat the substrate after application of the coating or coating precursor as is required with the presently available sol-gel method. Not only does this render the present method less costly and more efficient e.g. but not limited to less equipment costs, less energy costs, less production time but also, the opportunity for sodium ion migration and in turn sodium ion poisoning of the PASC coating of the present invention is significantly reduced. Further still, the method of the present invention is easily adapted to the formation of PASC coatings on continuous moving substrates, such as a glass float ribbon, where as the presently available sol-gel methods are not so easily adaptable.

Various modifications are included within the scope of the invention, which is defined by the following claims.

We claim:

1. A method for producing a layer of titanium dioxide in at least the crystalline phase, wherein said layer of titanium dioxide is a photocatalytically-activatable self-cleaning coating over glass float ribbon, and further wherein said coating is capable of having a photocatalytically-activated self-cleaning reaction rate of at least about 2×10$^{-3}$ cm$^{-1}$min$^{-1}$ upon exposure to ultraviolet radiation, said method comprising the steps of:

positioning a chemical vapor deposition coating apparatus over a tin bath containing a glass ribbon having a temperature of at least about 400° C. (752° F.);

directing a titanium dioxide precursor through said chemical vapor deposition apparatus over a surface of the glass ribbon heated to said temperature; and thereafter annealing the glass ribbon, whereby said layer of titanium dioxide is produced.

2. A method according to claim 1, wherein the glass ribbon is at a temperature of at least about 538° C.

3. A method according to claim 1, wherein the glass ribbon is at a temperature of at least about 600° C.

4. A method according to claim 1, further comprising the step of exposing the photocatalytically-activatable self-cleaning coating to ultraviolet radiation whereby a photocatalytically-activated self-cleaning coating is produced.

5. A method according to claim 1, wherein the crystalline phase is at least anatase.

6. A method for producing a glass sheet comprising a layer of titanium dioxide in at least the crystalline phase, wherein said layer of titanium dioxide is a photocatalytically-activatable self-cleaning coating, and further wherein said coating is capable of having a photocatalytically-activated self-cleaning reaction rate of at least about $2 \times 10^{-3}$ cm$^{-1}$ min$^{-1}$ upon exposure to ultraviolet radiation, said method comprising the steps of:

positioning a chemical vapor deposition coating apparatus over a tin bath containing a glass ribbon having a temperature of at least about 400° C. (752° F.);

directing a titanium dioxide precursor in a carrier gas stream through said chemical vapor deposition apparatus over a surface of the glass ribbon heated to said temperature; and thereafter annealing the glass ribbon; and producing a glass sheet from said annealed glass ribbon, whereby said glass sheet contains said layer of titanium dioxide.

7. A method according to claim 6, wherein the glass ribbon is at a temperature of at least about 538° C.

8. A method according to claim 6, wherein the glass ribbon is at a temperature of at least about 600° C.

9. A method according to claim 6, further comprising the step of exposing the photocatalytically-activatable self-cleaning coating to ultraviolet radiation whereby a photocatalytically-activated self-cleaning coating is produced.

10. A method according to claim 6 wherein the directing of the titanium dioxide precursor is directly onto the surface of the glass ribbon without any intervening coating layer.

11. A method according to claim 6 wherein the at least crystalline phase of the titanium dioxide is selected from at least one of anatase, rutile, and brookite crystalline forms of titanium dioxide and wherein an amorphous phase of titanium dioxide may also be present.

12. In a method for forming a glass float ribbon wherein the method includes the steps of melting glass batch materials in a furnace; delivering the molten glass onto a bath of molten tin; pulling the molten glass across the tin bath whereupon the glass is sized and controllably cooled to form a dimensionally stable glass float ribbon; removing the float ribbon from the tin bath; moving the float ribbon by conveying roller through a lehr to anneal the float ribbon; moving the float ribbon to a cutting station on conveying rollers where the ribbon is cut into glass sheets, the improvement comprising:

depositing over a surface of said float ribbon as the float ribbon is formed in said tin bath by chemical vapor deposition at least a crystalline phase of a photocatalytically-activatable self-cleaning coating, whereby said glass sheets comprise said photocatalytically-activatable self cleaning coating.

13. A method according to claim 12, further comprising the step of exposing said photocatalytically-activatable self-cleaning coating to ultraviolet radiation in order to provide a photocatalytically-activated self-cleaning reaction rate of at least about $2 \times 10^{-3}$ cm$^{-1}$ min$^{-1}$.

14. A method according to claim 12, wherein said crystalline phase comprises titanium dioxide.

15. A method according to claim 12, the improvement further comprising: depositing over a surface of said float ribbon as the float ribbon is formed in said tin bath a sodium ion diffusion barrier layer having a thickness of at least about 100 Å over a surface of said float ribbon and depositing in said tin bath said photocatalytically-activatable self-cleaning coating over said sodium ion diffusion barrier layer.

16. A method according to claim 12 wherein said photocatalytically-activatable self cleaning coating has a thickness in the range of about 100 to 2500 Angstroms.

17. A method according to claim 16, wherein said photocatalytically-activatable self cleaning coating has a thickness in the range of from about 100 to about 1000 Angstroms.

18. A method according to claim 17, wherein said photocatalytically-activatable self cleaning coating has a thickness in the range of from about 100 to about 500 Angstroms.

19. A method according to claim 18, wherein said photocatalytically-activatable self cleaning coating has a thickness in the range of from about 100 to about 400 Angstroms.

20. A method according to claim 19, wherein said photocatalytically-activatable self cleaning coating has a thickness in the range of from about 100 to about 200 Angstroms.

21. A method according to claim 12, the improvement further comprising: depositing a sodium ion diffusion barrier layer over a surface of said float ribbon as the float ribbon is formed in said tin bath, and depositing said photocatalytically-activatable self-cleaning coating over said sodium ion diffusion barrier layer in said tin bath wherein the sodium ion diffusion barrier layer comprises at least one of amorphous and crystalline phase metal oxides selected from cobalt oxides, chromium oxides, iron oxides, tin oxides, titanium oxides, zirconium oxides, fluorine-doped tin oxides, aluminum oxides, magnesium oxides, zinc oxides, and super-oxides and sub-oxides of any of the foregoing.

22. A method according to claim 21, wherein the sodium ion diffusion barrier layer comprises at least one metal oxide selected from magnesium oxides, aluminum oxides, zinc oxides, tin oxides, and super-oxides and sub-oxides of any of the foregoing.

23. A method according to claim 12, the improvement further comprising: depositing over a surface of said float ribbon as the float ribbon is formed in said tin bath a sodium ion diffusion barrier layer comprising silicon oxide and having a thickness of at least about 100 Å over a surface of said float ribbon and depositing in said tin bath said photocatalytically-activatable self-cleaning coating over said sodium ion diffusion barrier layer.

24. A method comprising the steps of:

providing by a float manufacturing process a glass article having at least one surface;

depositing in a tin bath during said float manufacturing process a photocatalytically-activatable self-cleaning coating over the surface of the article by chemical vapor deposition so that the coating has titanium dioxide in at least the crystalline phase and has a thickness ranging from at least 100 Å to less than 1 micron.

25. A method according to claim 24 wherein said photocatalytic reaction rate is determinable as the rate of removal of a stearic acid test film in the range of 100 to 200 Angstroms thick deposited over said photocatalytically-activatable self-cleaning coating wherein said photocatalytic reaction rate is quantitatively determinable as the slope of a curve formed by a plotting of a plurality of Fourier Transform Infrared Spectrophotometer measurements of the integrated intensity of carbon-hydrogen stretching vibrational absorption bands of the stearic acid test film versus an accumulated time of exposure of said photocatalytically-activatable self-cleaning coating to ultraviolet radiation of a frequency within the range of about 300 to 400 nanometers provided by an ultraviolet radiation source positioned over said photocatalytically-activatable self-cleaning coating and having an intensity of about 20 watts per square meter as measured at the surface of the photocatalytically-activatable self-cleaning coating.

26. A method according to claim 24, further comprising the step of exposing the photocatalytically-activatable self-cleaning coating to ultraviolet radiation whereby a photocatalytically-activated self-cleaning coating having a photocatalytically-activated self-cleaning reaction rate of at least about $2 \times 10^{-3}$ $cm^{-1}min^{-1}$ is produced.

27. A method according to claim 24 wherein said process is selected from a chemical vapor deposition process wherein the article has a minimum temperature to provide sufficient decomposition of the titanium precursor.

28. A process for the production of a titanium dioxide coating having a thickness ranging from about 100 to about 1000 Angstroms on a float glass ribbon, comprising:
    manufacturing a continuous float glass ribbon having a first major surface and an opposite major surface defined as a second major surface;
    positioning a chemical vapor deposition coating apparatus over the surface of the float ribbon at a point in a tin bath where the float ribbon has a temperature of at least about 400°C.;
    directing a titanium metal oxide precursor through said chemical vapor deposition apparatus over a surface of the float ribbon in said tin bath, and
    annealing the float ribbon
    whereby a titanium dioxide coating comprising at least anatase and amorphous phases of titanium dioxide is produced, and wherein
    the titanium dioxide coating is a photocatalytically-activatable self-cleaning coating.

29. A process for the production of a titanium dioxide coating according to claim 28, wherein the photocatalytically-activatable self-cleaning coating is capable of having a photocatalytically-activated reaction rate of at least about $2 \times 10^{-3}$ $cm^{-1}min^{-1}$.

30. A process for the production of a titanium dioxide coating according to claim 28, wherein the float ribbon has a temperature ranging from about 538° to less than about 800° C.

31. A process for the production of a titanium dioxide coating according to claim 28, wherein said coating is physically durable.

32. A process for the production of a titanium dioxide coating according to claim 28, wherein said coating is resistant to chemical attack.

33. A process for the production of a titanium dioxide coating according to claim 28, wherein the photocatalytically-activatable self-cleaning coating is capable of having a photocatalytically-activated self-cleaning reaction rate of at least about $5 \times 10^{-3}$ $cm^{-1}min^{-1}$.

34. A process for the production of a titanium dioxide coating according to claim 28, wherein the photocatalytically-activatable self-cleaning coating is capable of having a photocatalytically-activated self-cleaning reaction rate of at least about $7.79 \times 10^{-3}$ $cm^{-1}min^{-1}$.

35. A process for the production of a titanium dioxide coating according to claim 28, wherein the photocatalytically-activatable self-cleaning coating is capable of having photocatalytically-activated self-cleaning reaction rate of at least about $12.29 \times 10^{-3}$ $cm^{-1}min^{-1}$.

36. A method comprising the steps of:
    providing by a float glass manufacturing process a glass article having at least one surface;
    depositing a sodium ion diffusion barrier coating over the surface of the article by chemical vapor deposition in a tin bath during the glass manufacturing process; and
    depositing at a temperature in the range of from about 538° to below about 800° C. (1000° to 1472° F.) a photocatalytically-activatable self-cleaning coating over the barrier coating so that the photocatalytically-activatable self-cleaning coating comprises titanium dioxide in at least the crystalline phase and has a thickness ranging from at least about 100 Å to less than 1 micron.

37. A method according to claim 36, wherein the photocatalytically-activatable self-cleaning coating is deposited at a temperature ranging from 554° to less than about 800° C. (1029° to 1472° F.).

38. A method according to claim 36, further comprising the step of exposing the photocatalytically-activatable self-cleaning coating to ultraviolet radiation whereby a photocatalytically-activated self-cleaning coating is produced.

39. A method according to claim 36, wherein the glass ribbon is at a temperature of 648° C. to 800° C.

* * * * *